US009256750B2

(12) United States Patent
Thom et al.

(10) Patent No.: US 9,256,750 B2
(45) Date of Patent: *Feb. 9, 2016

(54) SECURE CREDENTIAL UNLOCK USING TRUSTED EXECUTION ENVIRONMENTS

(71) Applicant: MICROSOFT TECHNOLOGY LICENSING, LLC, Redmond, WA (US)

(72) Inventors: Stefan Thom, Snohomish, WA (US); Robert K. Spiger, Seattle, WA (US); Magnus Nyström, Sammamish, WA (US); Himanshu Soni, Bothell, WA (US); Marc R. Barbour, Woodinville, WA (US); Nick Voicu, Bellevue, WA (US); Xintong Zhou, Bellevue, WA (US); Kirk Shoop, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/672,143

(22) Filed: Mar. 28, 2015

(65) Prior Publication Data

US 2015/0213278 A1    Jul. 30, 2015

Related U.S. Application Data

(63) Continuation of application No. 14/105,070, filed on Dec. 12, 2013, now Pat. No. 9,015,490, which is a continuation of application No. 13/176,735, filed on Jul. 5, 2011, now Pat. No. 8,612,766.

(51) Int. Cl.
*G06F 21/00* (2013.01)
*G06F 21/60* (2013.01)
(Continued)

(52) U.S. Cl.
CPC .............. *G06F 21/602* (2013.01); *G06F 21/30* (2013.01); *G06F 21/31* (2013.01); *G06F 21/57* (2013.01);
(Continued)

(58) Field of Classification Search
CPC ......... G06F 21/30; G06F 21/31; G06F 21/57; G06F 21/602; G06F 2221/2013; G06F 2221/2107; G06F 2221/2131; H04L 2209/127; H04L 2209/0822; H04L 2209/0861; H04L 2209/3271
USPC ................ 713/182, 183, 184, 193; 726/6, 18; 380/44
See application file for complete search history.

(56) References Cited

U.S. PATENT DOCUMENTS

| 7,095,859 B2 | 8/2006 | Challener |
| 7,364,087 B2 | 4/2008 | Zimmer |

(Continued)

OTHER PUBLICATIONS

Sundeep Bajikar, Trusted Platform Module (TPM) based Seurity on Notebook PCs—White Paper, Intel Jun. 20, 2002.
(Continued)

*Primary Examiner* — Samson Lemma
(74) *Attorney, Agent, or Firm* — Judy Yee; Timothy Churna; Micky Minhas

(57) ABSTRACT

Computing devices utilizing trusted execution environments as virtual smart cards are designed to support expected credential recovery operations when a user credential, e.g., personal identification number (PIN), password, etc. has been forgotten or is unknown. A computing device generates a cryptographic key that is protected with a PIN unlock key (PUK) provided by an administrative entity. If the user PIN cannot be input to the computing device the PUK can be input to unlock the locked cryptographic key and thereby provide access to protected data. A computing device can also, or alternatively, generate a group of challenges and formulate responses thereto. The formulated responses are each used to secure a computing device cryptographic key. If the user PIN cannot be input to the computing device an entity may request a challenge. The computing device issues a challenge from the set of generated challenges. Upon receiving a valid response back, the computing device can unlock the secured computing device cryptographic key associated with the issued challenge and subsequently provide access to protected data.

20 Claims, 12 Drawing Sheets

(51) Int. Cl.
*G06F 21/31* (2013.01)
*G06F 21/57* (2013.01)
*G06F 21/30* (2013.01)
*H04L 9/08* (2006.01)
*H04L 9/32* (2006.01)

(52) U.S. Cl.
CPC . *G06F 2221/2103* (2013.01); *G06F 2221/2107* (2013.01); *G06F 2221/2131* (2013.01); *H04L 9/0822* (2013.01); *H04L 9/0861* (2013.01); *H04L 9/3271* (2013.01); *H04L 2209/127* (2013.01)

(56) References Cited

U.S. PATENT DOCUMENTS

| | | | |
|---|---|---|---|
| 7,577,258 B2 | 8/2009 | Wiseman | |
| 8,162,227 B2* | 4/2012 | Asnaashari et al. | 235/492 |
| 2006/0265598 A1 | 11/2006 | Plaquin | |
| 2007/0255943 A1* | 11/2007 | Kern et al. | 713/155 |
| 2010/0088525 A1* | 4/2010 | Ureche et al. | 713/193 |
| 2010/0202617 A1 | 8/2010 | Balakrishnan | |
| 2011/0296495 A1* | 12/2011 | Smeets | 726/4 |

OTHER PUBLICATIONS

"Embedded Systems and Trusted Computing Security", Retrieved at <<http://www.trustedcomputinggroup.org/files/resource_files/8D453963-1 D09-3519-ADA6FED6DA208CD6/embedded_bkgdr_final_sept_14_2005.pdf>>, Sep. 14, 2005, pp. 4.

Shi, Weidong, "Architectural Support for Protecting Memory Integrity and Confidentiality", Retrieved at <<http://arch.ece.gatech.edu/pub/shi.pdf>>, Aug. 2006, pp. 154.

Collins, Luke, "Who can You Trust?", Retrieved at<< http://ieeexplore.ieee.org/stamp/stamp.jsp?arnumber=05308513>>, Jun.-Jul. 2004, pp. 39-41.

"BitLocker Drive Encryption Step-by-Step Guide for Windows 7", Retrieved at <<http://technet.microsoft.com/en-us/library/dd835565(WS.10).aspx>>, Sep. 18, 2009, pp. 6.

"Smart Security Interface TPM", Retrieved at <<http://www.charismathics.com/pdf/products/CSSLTPM_web.pdf>>, Retrieved Date: Dec. 20, 2010, pp. 2.

"BitLocker Drive Encryption Overview", Retrieved at <<http://technet.microsoft.com/en-usllibrary/cc73277 4.aspx>>, Retrieved Date: Dec. 20, 2010, pp. 3.

* cited by examiner

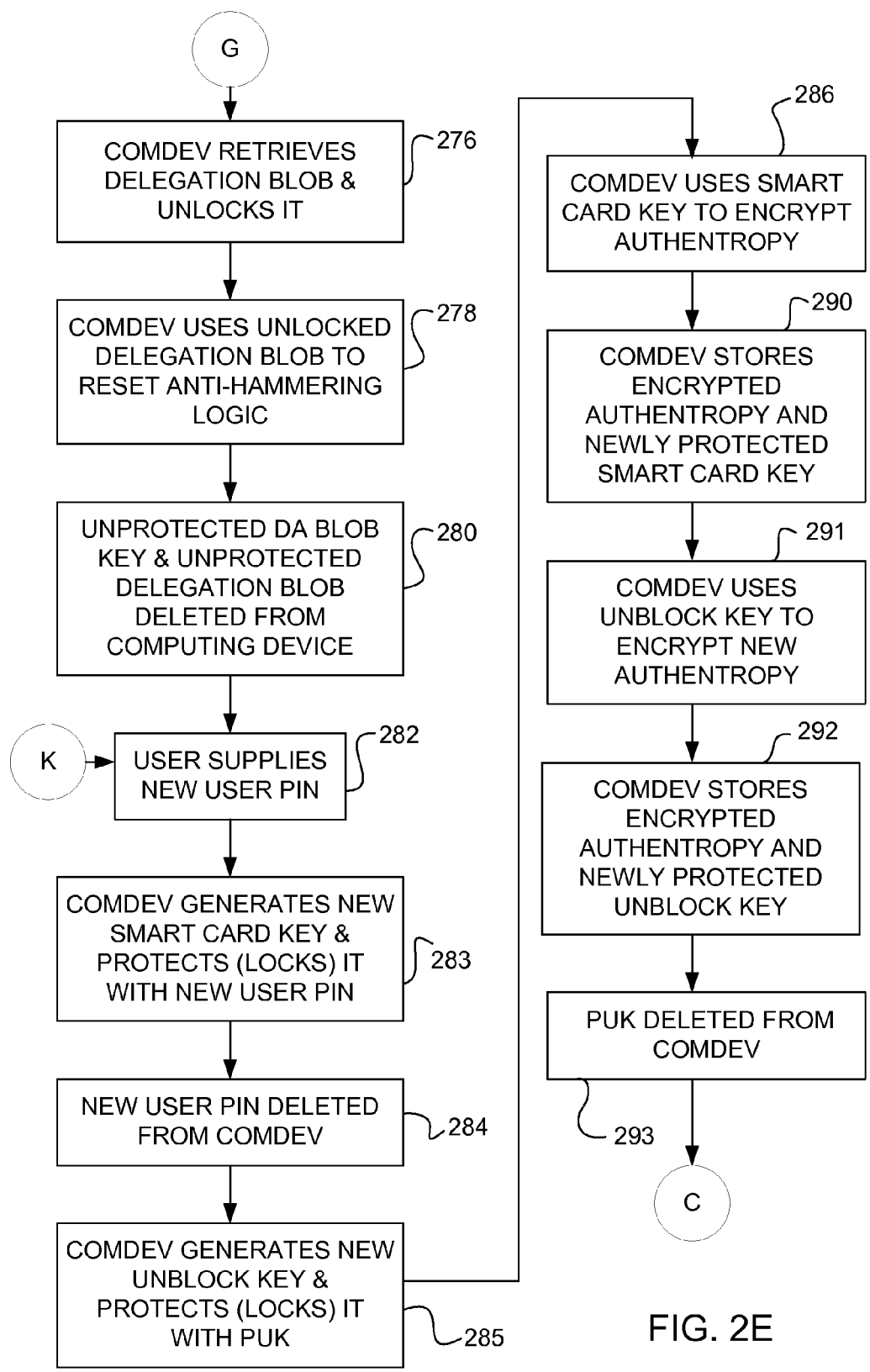

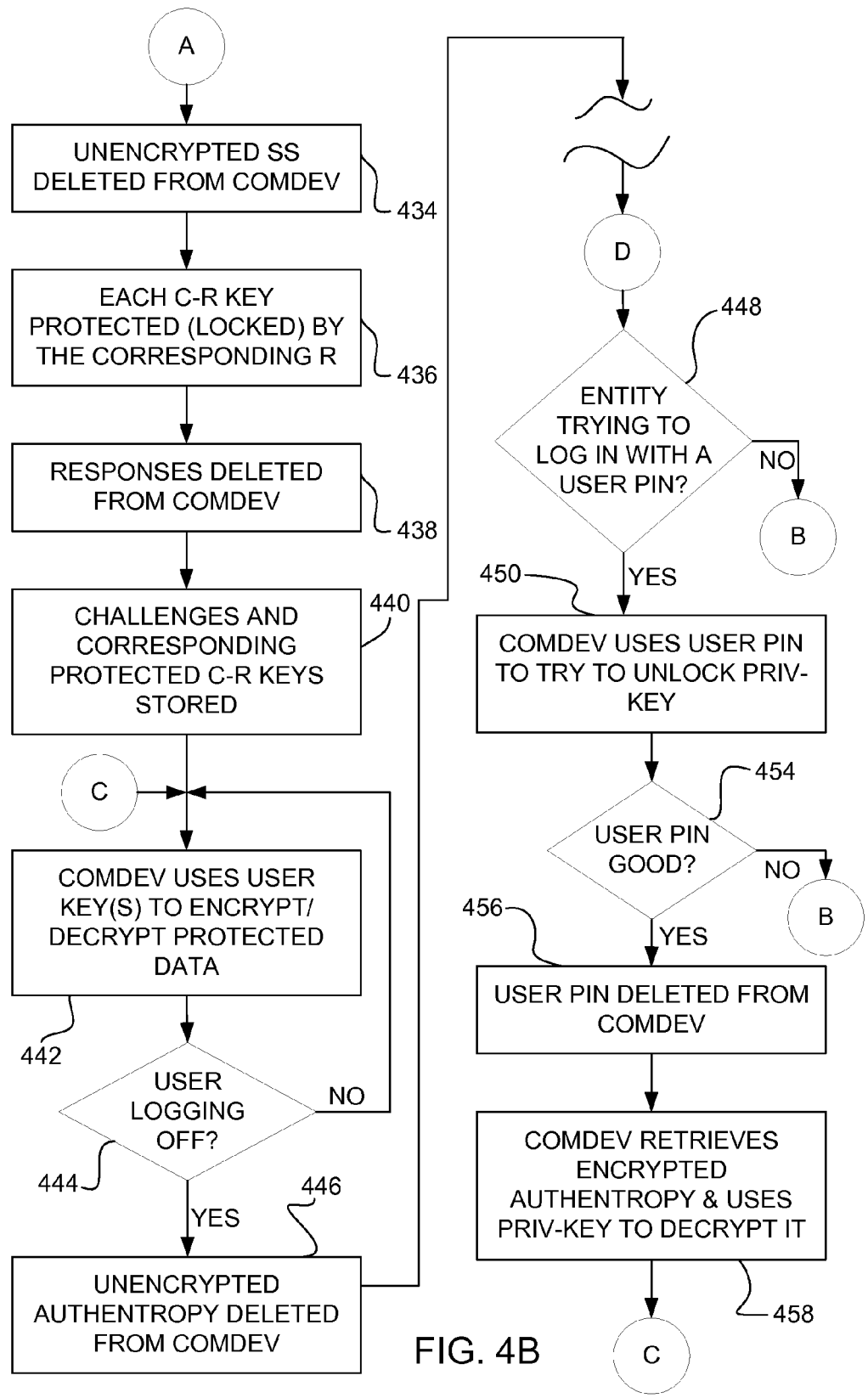

SECURE CREDENTIAL UNLOCK USING TRUSTED EXECUTION ENVIRONMENTS

RELATED APPLICATIONS

This application is a Continuation of and claims benefit from U.S. patent application Ser. No. 14/105,070 that was filed on Dec. 12, 2013, and that is a Continuation of U.S. patent application Ser. No. 13/176,735 (U.S. Pat. No. 8,612,766) that was filed on Jul. 5, 2011 (Issued Dec. 17, 2013), each of which is incorporated herein by reference in its entirety.

BACKGROUND

On many computing devices, e.g., computers, laptops, cell phones, etc., data can be protected from unauthorized users and entities through the use of encryption. Cryptographic keys are used to protect data stored on, or otherwise accessible to, a computing device that the computing device's owner and/or authorized user and/or entity, collectively referred to herein as user, does not want attackers, i.e., unauthorized individuals and/or entities that attempt to obtain data from others' computing devices, to be able to access. Cryptographic keys are pieces of information, or parameters, which are used to determine the output value of a cryptographic algorithm that is used to encrypt and decrypt data and/or other keys to be protected. Without the proper cryptographic key(s), and proper access to them, a cryptographic algorithm will produce no useful result, and thus, attackers can not gain access to protected data.

Computing devices can protect access to their cryptographic keys, and thus the data the cryptographic keys protect, with one or more user credentials such as a user personal identification number, i.e., PIN, or password. User credentials are generally intended to be unique and secret to a computing device user so that only a valid user can input the correct user credential(s) to log onto the computing device and gain access to its protected data.

However, sometimes valid users forget their user credential(s). Also, there can be legitimate instances when a second party, e.g., another user, an administrative entity, etc., may want access to the computing device but have no notion of the valid user credential value(s). A methodology has been established to allow a valid user or legitimate second party to gain access to a computing device using a challenge-response based unlock of a computing device's credentials, i.e., cryptographic keys. A methodology has also been established to allow a valid user or legitimate second party to gain access to a computing device using a PIN unlock key, also referred to herein as a PUK, to unlock a computing device's credentials.

Trusted Execution Environments, also referred to herein as TrEEs, are utilized on computing devices to provide strong asymmetric cryptographic key protection from would-be attackers. A TrEE, therefore, can be utilized as a convenient substitute for regular credential container environments such as smart cards. However, current TrEEs do not necessarily provide the capabilities that a legitimate user or second party can rely on to perform traditional credential recovery operations, e.g., PIN-based unlock of computing device credentials or challenge-response based unlock of computing device credentials, when a user credential has been forgotten or is unknown. This lack of traditional computing device credential recovery operation support can pose a detriment to the eventual usefulness of a TrEE within a computing device.

Thus, it is desirable to develop TrEE-supported functionality that can be utilized in conjunction with existing computing device credential recovery operations to enable legitimate access to computing device credentials without user credentials such as a user PIN and/or password.

SUMMARY

This summary is provided to introduce a selection of concepts in a simplified form which are further described below in the Detailed Description. This summary is not intended to identify key or essential features of the claimed subject matter, nor is it intended to be used as an aid in determining the scope of the claimed subject matter.

Embodiments discussed herein include systems and methodology for supporting traditional computing device credential recovery operations for a computing device when valid user credential(s), e.g., user personal identification number (PIN), etc., cannot be input to the computing device, e.g., because the user credential value(s) has been forgotten, the legitimate user attempting to gain access to the computing device does not know the user credential(s), etc. In embodiments the systems include a trusted execution environment (TrEE). In embodiments the methodologies include interaction with a TrEE of a computing device. In aspects of embodiments the TrEE acts as a virtual smart card for a computing device.

In embodiments an authentropy, i.e., a random, or pseudo random, value, for a computing device is derived by, or otherwise provided to, the computing device. In embodiments the computing device uses the authentropy to wrap and unwrap one or more cryptographic keys for encrypting and/or decrypting data and/or other keys protected by the computing device.

In embodiments the computing device generates a virtual smart card key that is used to protect the authentropy. In embodiments the virtual smart card key is protected with one or more user credentials, e.g., a user personal identification number (PIN), a user password, etc.

In embodiments the computing device generates an unblock key and protects the unblock key with a PIN unlock key (PUK) provided to the computing device. In embodiments the computing device also protects the authentropy with the unblock key.

In embodiments where the valid user credential(s) is input to the computing device for a user to log onto the computing device and gain access to the computing device credentials, i.e., cryptographic key(s), and the data and/or key(s) it (they) protects, the valid user credential(s) is used to gain access to the protected virtual smart card key. In embodiments the virtual smart card key is used to gain access to the authentropy. In embodiments the authentropy is used to unlock and/or decrypt protected data and/or other protected keys, collectively referred to herein as protected data, either directly or indirectly.

In embodiments where the valid user credential(s) is not available to be input to the computing device, the PUK can be input to the computing device and the computing device can utilize the PUK to gain access to the protected unblock key. In embodiments the unblock key is used to gain access the authentropy. In embodiments the authentropy is used to unlock and/or decrypt protected data, either directly or indirectly.

In other embodiments the computing device generates a group of one or more challenges. In these other embodiments the computing device formulates a response for each challenge. In an aspect of these other embodiments a response to a challenge is a function of the challenge and a shared secret between the computing device and an administrative entity.

In these other embodiments the computing device generates a c-r, challenge-response, key for each challenge-response pair and protects the authentropy with each c-r key. In these other embodiments the computing device protects each c-r key with the respective response formulated for the challenge associated with the c-r key.

In these other embodiments where the valid user credential(s) is not available to be input to the computing device the computing device can output a challenge from the set of one or more generated challenges in response to a request for a challenge. In these other embodiments if the computing device receives a response back for a challenge the computing device will attempt to utilize the received response to gain access to the protected c-r key associated with the issued challenge. In these other embodiments a valid response provides access to the respective c-r key which is then used to gain access to the authentropy. As noted, in embodiments the authentropy is used to unlock and/or decrypt protected data, either directly or indirectly.

In embodiments a reset lockout command along with proper identification can be utilized by the computing device to reset computing device logic for the prevention of exhaustive search attacks, i.e., anti-hammering logic. In embodiments anti-hammering logic continuously increases a time delay the computing device will wait to process an input for access to the computing device subsequent to each invalid input that constitutes an attempt to gain computing device access, effectively creating a computing device lockout. When a computing device lockout results, either due to an attacker attempting to gain unwarranted computing device access by trying to guess the correct user credential value(s) or because a legitimate user has performed too many failed access attempts without the proper user credential(s), an administrative entity can chose to reset the lockout. In embodiments, to reset a computing device lockout a reset lockout command is issued to the computing device and the PUK is also provided to the computing device. In embodiments the PUK is used to gain access to the unblock key which, either directly or indirectly, protects a delegation blob for reset lockout authority. In embodiments once the protected delegation blob is unlocked or decrypted, i.e., unprotected, the unprotected delegation blob is used to reset the anti-hammering logic and computing device lockout.

BRIEF DESCRIPTION OF THE DRAWINGS

These and other features will now be described with reference to the drawings of certain embodiments and examples which are intended to illustrate and not to limit, and in which:

FIGS. 2A-2E depict an embodiment logic flow for a secure PIN based credential unlock methodolog.

FIGS. 4A-4D depict an embodiment logic flow for a secure challenge-response based credential unlock methodology.

DETAILED DESCRIPTION

In the following description, for purposes of explanation, numerous specific details are set forth in order to provide a thorough understanding of embodiments described herein. It will be apparent however to one skilled in the art that the embodiments may be practiced without these specific details. In other instances well-known structures and devices are either simply referenced or shown in block diagram form in order to avoid unnecessary obscuration. Any and all titles used throughout are for ease of explanation only and are not for any limiting use.

Figure 1:
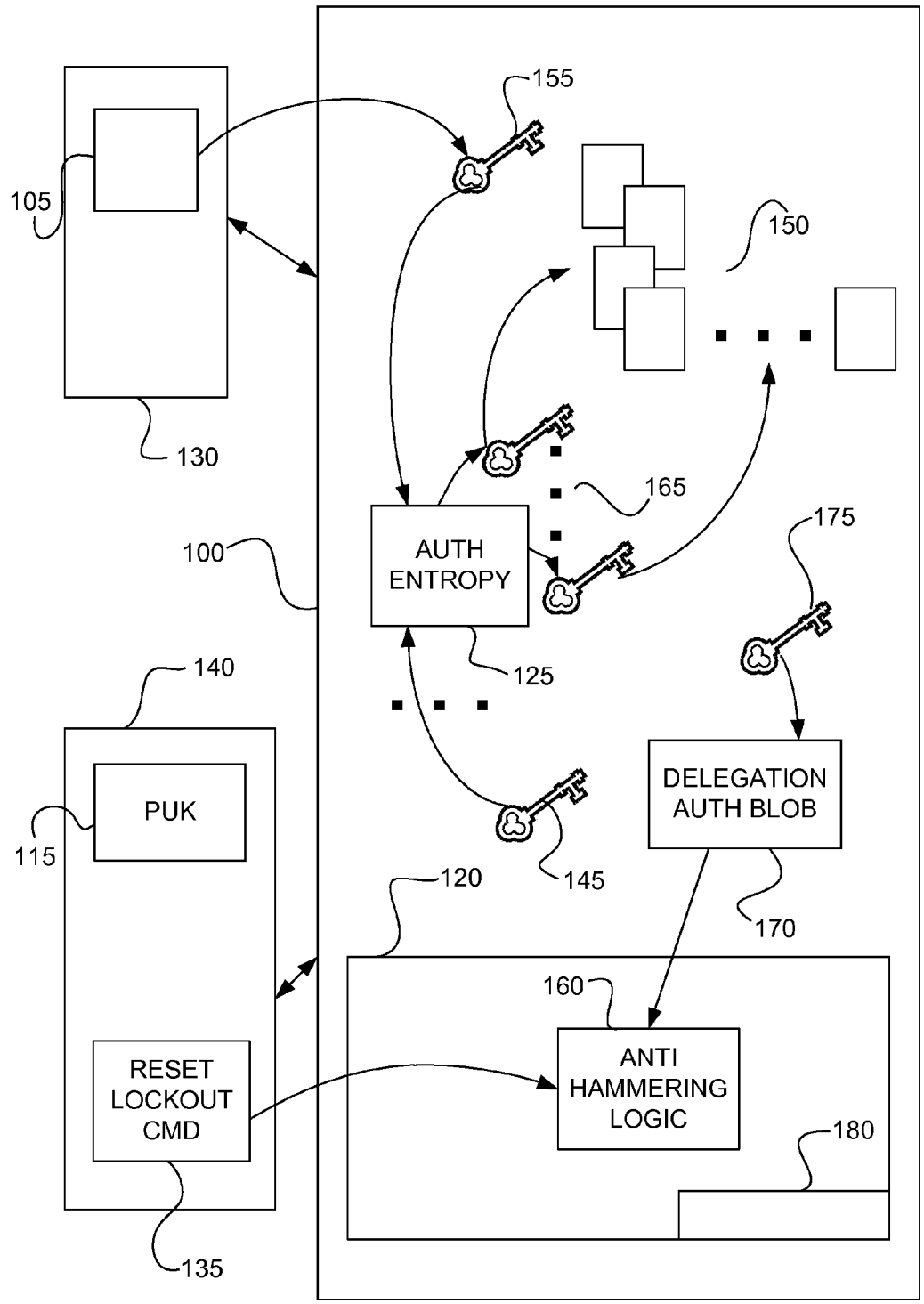
FIG. 1 depicts an embodiment environment in which secure PIN based credential unlock systems and methodologies are deployed.

Referring to FIG. 1, an embodiment computing device 100, also referred to herein as a comdev 100, is depicted upon which a secure PIN based credential unlock system and methodology can be employed and/or utilized with. In embodiments the computing device 100 is a desktop computer, laptop, cellular phone, smart phone, etc.; i.e., a device capable of executing software. In an embodiment the computing device 100 includes usage of a trusted execution environment 120, i.e., TrEE 120. In an aspect of this embodiment the TrEE 120 is a trusted platform module 120, i.e., TPM 120. In aspects of this embodiment a TrEE 120, e.g., a TPM 120, is a hardware chip that is maintained on the computing device 100 and implements the generation of cryptographic keys and assists in providing limitations to their usage. In an embodiment the TrEE 120 supports administration entities 140 providing a legitimate user 130 who cannot otherwise gain access to the computing device 100 and data 150 it protects, because, e.g., the user 130 has forgotten their user credential(s), e.g., personal identification number 105, i.e., user PIN 105, password, etc., collectively referred to herein as user PIN 105, access to the computing device 100 and its protected data 150. In an embodiment the TrEE 120 acts as a virtual smart card for the computing device 100.

In an embodiment the computing device generates a virtual smart card key 155 at some provisioning time, e.g., t(p). In an aspect of this embodiment the TrEE 120 of the computing device generates a virtual smart card key 155. In an embodiment the user 130 creates a user PIN 105 that is utilized to secure, protect or lock, also collectively referred to herein as lock, the virtual smart card key 155. In embodiments, without inputting the correct user PIN 105 to the computing device 100 a user 130 is locked out of the computing device 100, i.e., the user 130 is prohibited from using the computing device 100 and gaining access to protected data 150 thereon.

In an embodiment the protected virtual smart card key 155 is stored on the computing device 100. In an aspect of this embodiment the locked virtual smart card key 155 is stored in meta data 180 for the TrEE 120 of the computing device 100.

In an embodiment an administrative entity 140, e.g., administrator, administrator group, one or more applications that when executed under the control of an administrator and/or administrative group perform administrative functionality, etc., interacts with the computing device 100. In an embodiment the administrative entity 140 generates a PIN unlock key, also referred to herein as a PUK, 115 for the computing device 100 and provides it to the computing device 100 at some provisioning time, e.g., t(p). In an aspect of this embodiment a PUK 115 is generated by one or more applications under the control of an administrator or other individual or entity with authority to unlock, or allow the unlocking of the computing device's credentials, e.g., one or more computing device cryptographic keys used for encrypting and/or decrypting protected data 150.

In an embodiment the computing device 100 generates an unblock key 145 at some provisioning time, e.g., t(p), and locks the unblock key 145 with the PUK 115. In an aspect of this embodiment the TrEE 120 of the computing device 100 generates the unblock key 145 and locks the unblock key 145 with the PUK 115.

In an embodiment the computing device 100 stores the locked unblock key 145. In an aspect of this embodiment the locked unblock key 145 is stored in meta data 180 for the TrEE 120.

In an embodiment the computing device 100 generates an authentropy 125 at some provisioning time, e.g., t(p). In an alternative embodiment a user 130 provides an authentropy 125 to the computing device 100 at some provisioning time, e.g., t(p).

In an embodiment an authentropy 125 is a random, or pseudo-random, number. In an aspect of this embodiment the authentropy 125 is generated, or otherwise created, with sufficient entropy, which is a measure of the uncertainty associated with the randomness of the authentropy value.

In an embodiment the computing device 100 encrypts the authentropy 125 with the virtual smart card key 155. In an aspect of this embodiment the TrEE 120 encrypts the authentropy 125 with the virtual smart card key 155.

In an embodiment the authentropy 125 encrypted with the virtual smart card key 155 is stored. In an aspect of this embodiment the authentropy 125 encrypted with the virtual smart card key 155 is stored in meta data 180 for the TrEE 120.

In an embodiment the computing device 100 encrypts the authentropy 125 with the unblock key 145 and stores the resultant encrypted authentropy. In an aspect of this embodiment the TrEE 120 of the computing device 100 encrypts the authentropy 125 with the unblock key 145. In an aspect of this embodiment the TrEE 120 stores the authentropy 125 encrypted with the unblock key 145 in its meta data 180.

In an embodiment the computing device 100 generates one or more cryptographic keys 165 and/or key pairs 165, also collectively referred to herein as user keys 165 or a symmetric key 165, for use in encrypting and/or decrypting data 150 stored on and/or otherwise accessible to and to be protected by the computing device 100. In an embodiment one or more user keys 165 are also, or alternatively, used for encrypting and decrypting other user keys 165, generated by, stored on and/or otherwise accessible to and to be protected by the computing device 100. Data 150 and keys 165 that are protected by, e.g., encrypted with, one or more user keys 165 are collectively referred to herein as protected data 150.

In an aspect of this embodiment the computing device 100 generates one or more user keys 165 and locks and/or encrypts the user keys 165 with the authentropy 125.

In another, or alternative, aspect of this embodiment the computing device 100 generates one or more user keys 165 utilizing a key derivation function and the authentropy 125. In this other aspect of this embodiment the TrEE 120 may generate user keys 165 utilizing a key derivation function and the authentropy 125.

In an embodiment, prior to a user 130 logging off the computing device 100 the unencrypted authentropy 125 is deleted from the computing device 100.

In an embodiment, under normal computing device credential, e.g., cryptographic key, access, a user 130 inputs their user PIN 105 to the computing device 100. In an embodiment the computing device 100 uses the inputted user PIN 105 to unprotect, or unlock, the virtual smart card key 155. If the inputted user PIN 105 is valid and the virtual smart card key 155 is thereby successfully unlocked, in an embodiment the computing device 100 utilizes the virtual smart card key 155 to decrypt the authentropy 125 previously encrypted with the virtual smart card key 155. In an embodiment the computing device 100 utilizes the decrypted authentropy 125 to gain access to protected user keys 165, e.g., by unlocking, decrypting and/or regenerating the requisite user key(s) 165. Unprotected user keys 165 can be used to decrypt and re-encrypt protected data 150 as needed.

However, if a legitimate user 130 cannot input the correct user PIN 105 to the computing device 100, e.g., the user 130 has forgotten their user PIN 105, the user 130 has legitimate access to the computing device 100 but does not know the user PIN 105, etc., then the TrEE 120 can assist an administrative entity 140 to gain access to the computing device 100 and its credentials. In this situation and an embodiment the administrative entity 140 can input the PUK 115 to the computing device 100. In an embodiment the computing device 100 uses the inputted PUK 115 to unlock the unblock key 145. In an aspect of this embodiment the TrEE 120 of the computing device 100 uses the PUK 115 to unlock the unblock key 145. If the inputted PUK 115 is valid and the unblock key 145 is thereby successfully unlocked, in an embodiment the computing device 100 utilizes the unblock key 145 to decrypt the authentropy 125 previously encrypted with the unblock key 145. In an aspect of this embodiment the TrEE 120 of the computing device 100 uses the unlocked unblock key 145 to decrypt the prior encrypted authentropy 125.

In an embodiment the computing device 100 utilizes the decrypted authentropy 125 to gain access to protected user keys 165, e.g., by unlocking, decrypting and/or regenerating the requisite user key(s) 165. Unprotected user keys 165 can be used to decrypt and re-encrypt protected data 150 as needed.

In an embodiment, once the administrative entity 140 and/or user 130 gains access to the computing device 100 and Its credentials the user 130 can reset the user PIN 105. If the user 130 resets the user PIN 105 to a new value, in an embodiment the computing device 100 uses the new user PIN 105 to lock the virtual smart card key 155. In an embodiment and this situation the computing device 100 generates a new virtual smart card key 155 and locks the newly generated virtual smart card key 155 with the new user PIN 105. In an embodiment and this situation the new virtual smart card key 155 is used to encrypt the authentropy 125.

In an embodiment the newly locked virtual smart card key 155 is stored. In an aspect of this embodiment the TrEE 120 stores the newly locked virtual smart card key 155 in its meta data 180.

In an embodiment the computing device 100 employs anti-hammering logic 160. In an aspect of this embodiment the TrEE 120 of the computing device 100 manages the anti-hammering logic 160 for the computing device 100. In an embodiment anti-hammering logic 160 is one or more applications that, when executed, ensure progressively longer wait times for when an inputted user PIN 105 or PUK 115 will be processed for an attempt to unlock the computing device's credentials. In an embodiment the wait time is progressively increased upon input of an invalid user PIN 105 or an invalid PUK 115. In an aspect of this embodiment the anti-hammering logic 160 employs exponentially longer wait times between computing device credential access attempts. Thus, for example, after a third failed attempt by an entity to gain access to the computing device 100 and its credentials, the anti-hammering logic 160 may employ a wait time, also referred to herein as a delay time, or hammer delay time, of two (2) seconds before a fourth attempt will be processed; after a failed fourth attempt the anti-hammering logic 160 may employ a hammer delay time of four (4) seconds before a fifth attempt will be processed; after a failed fifth attempt the anti-hammering logic 160 may employ a hammer delay time of eight (8) seconds before a sixth attempt will be processed; etc.

Thus, in an embodiment a user 130 with knowledge of the valid user PIN 105 or an administrative entity 140 with knowledge of the valid PUK 115 may still find that they have to wait a significant time to try and gain access to a computing device 100 and its credentials. For example, a would-be attacker may already have made several unsuccessful attempts to gain improper access to the computing device 100 resulting in the anti-hammering logic 160 significantly increasing the hammer delay time before any other access attempt, legitimate or otherwise, will be processed.

Therefore, in an embodiment the computing device 100 generates a delegation authorization binary large object, i.e., blob, 170, also referred to herein as a DA blob 170, at some provisioning time, e.g., t(p). In an aspect of this embodiment the TrEE 120 of the computing device 100 generates the DA blob 170.

In an embodiment the computing device 100 utilizes a generated DA blob key 175 to protect the DA blob 170. In an aspect of this embodiment the TrEE 120 encrypts, or otherwise locks, the DA blob 170 with the DA blob key 175. In this embodiment the authentropy 125 protects the generated DA blob key 175 that protects the DA blob 170. In this embodiment the authentropy 125 is locked, or encrypted, with the unblock key 145 which itself is locked with the PUK 115.

In this embodiment the computing device 100 generates the DA blob key 175 at some provisioning time, e.g., t(p). In an aspect of this embodiment the TrEE 120 of the computing device 100 generates the DA blob key 175. In an aspect of this embodiment the DA blob key 175 is stored in TrEE meta data 180.

In an alternative embodiment the computing device 100 utilizes the unblock key 145 to lock the DA blob 170. In an aspect of this alternative embodiment the TrEE 120 locks the DA blob 170 with the unblock key 145.

In a second alternative embodiment the computing device 100 utilizes the PUK 115 provided to the computing device 100 to lock the DA blob 170. In an aspect of this second alternative embodiment the TrEE 120 locks the DA blob 170 with the PUK 115.

In still other alternative embodiments the computing device can protect, e.g., lock or encrypt, the DA blob 170 using other values or combinations of values, e.g., encrypt the DA blob 170 with the authentropy 125, etc.

In an embodiment the locked DA blob 170 is stored. In an aspect of this embodiment the TrEE 120 stores the locked DA blob 170 in its meta data 180.

In an embodiment if the computing device's anti-hammering logic 160 is in effect an entity, e.g., an administrative entity 140, can circumvent the anti-hammering logic 160 and reset it so that it no longer creates access attempt delays. In an embodiment if the proper entity, referred to herein collectively as the administrative entity 140, inputs a reset lockout command 135 and the proper PUK 115 to the computing device 100, the computing device 100 can reset its anti-hammering logic 160.

In an embodiment the computing device 100 uses the inputted PUK 115 to unlock the unblock key 145. In an aspect of this embodiment the TrEE 120 of the computing device 100 uses the PUK 115 to unlock the unblock key 145. If the inputted PUK 115 is valid and the unblock key 145 is thereby successfully unlocked, the computing device 100 utilizes the unblock key 145 to decrypt the authentropy 125 previously encrypted with the unblock key 145. In an aspect of this embodiment the computing device's TrEE 120 uses the unlocked unblock key 145 to decrypt the previously encrypted authentropy 125.

In an embodiment the computing device 100 utilizes the decrypted authentropy 125 to unprotect, e.g., unlock, decrypt, and/or regenerate, the DA blob key 175 protecting the DA blob 170. In an aspect of this embodiment the TrEE 120 uses the decrypted authentropy 125 to unprotect the DA blob key 175.

In an embodiment the computing device retrieves the protected DA blob 170 from storage and utilizes the unprotected DA blob key 175 to unprotect, e.g., unlock or decrypt, the DA blob 170. In an aspect of this embodiment the TrEE 120 retrieves the protected DA blob 170 from storage in its meta data 180 and unprotects it with the DA blob key 175. In an embodiment the unprotected DA blob 170 is used to reset the anti-hammering logic 160. In an aspect of this embodiment the TrEE 120 utilizes the unprotected DA blob 170 to reset the anti-hammering logic 160.

In an embodiment, once the administrative entity 140 and/or user 130 gains access to the computing device 100 and its credentials a new user PIN 105 can be generated and provided to the computing device 100. In an embodiment a new virtual smart card key 155 is generated by the computing device 100 and locked with the new user PIN 105. In this embodiment the new virtual smart card key 155 is used to encrypt the authentropy 125.

In an alternative embodiment the existing virtual smart card key 155 is locked with the new user PIN 105. In this alternative embodiment the existing virtual smart card key 155 continues to be used to protect, e.g., lock or encrypt, the authentropy 125.

In an embodiment, once the administrative entity 140 and/or user 130 gains access to the computing device 100 and its credentials the computing device 100 can generate anew authentropy 125 or, alternatively, a user 130 can issue a new authentropy 125 for use by the computing device 100. If the computing device 100 gets anew authentropy 125 in an embodiment the computing device 100 uses the new authentropy 125 to protect, e.g., lock or encrypt or regenerate, user keys 165. In an aspect of this embodiment where the authentropy 125 is used to generate a user key 165, e.g., when the authentropy 125 is used with a key derivation function to derive a user key 165, then the original user key 165 created with the prior authentropy 125 is first used to decrypt any protected data 150 it has encrypted and then the newly generated user key 165 is used to re-encrypt the respective protected data 150.

In an embodiment with a new authentropy 125 the computing device 100 generates a new unblock key 145. In an embodiment the computing device 100 encrypts the new authentropy 125 with the unblock key 145.

FIGS. 2A-2E illustrate an embodiment logic flow for a secure PIN based credential unlock methodology. While the following discussion is made with respect to systems portrayed herein the operations described may be implemented in other systems. The operations described herein are not limited to the order shown. Additionally, in other alternative embodiments more or fewer operations may be performed.

Figure 2A:
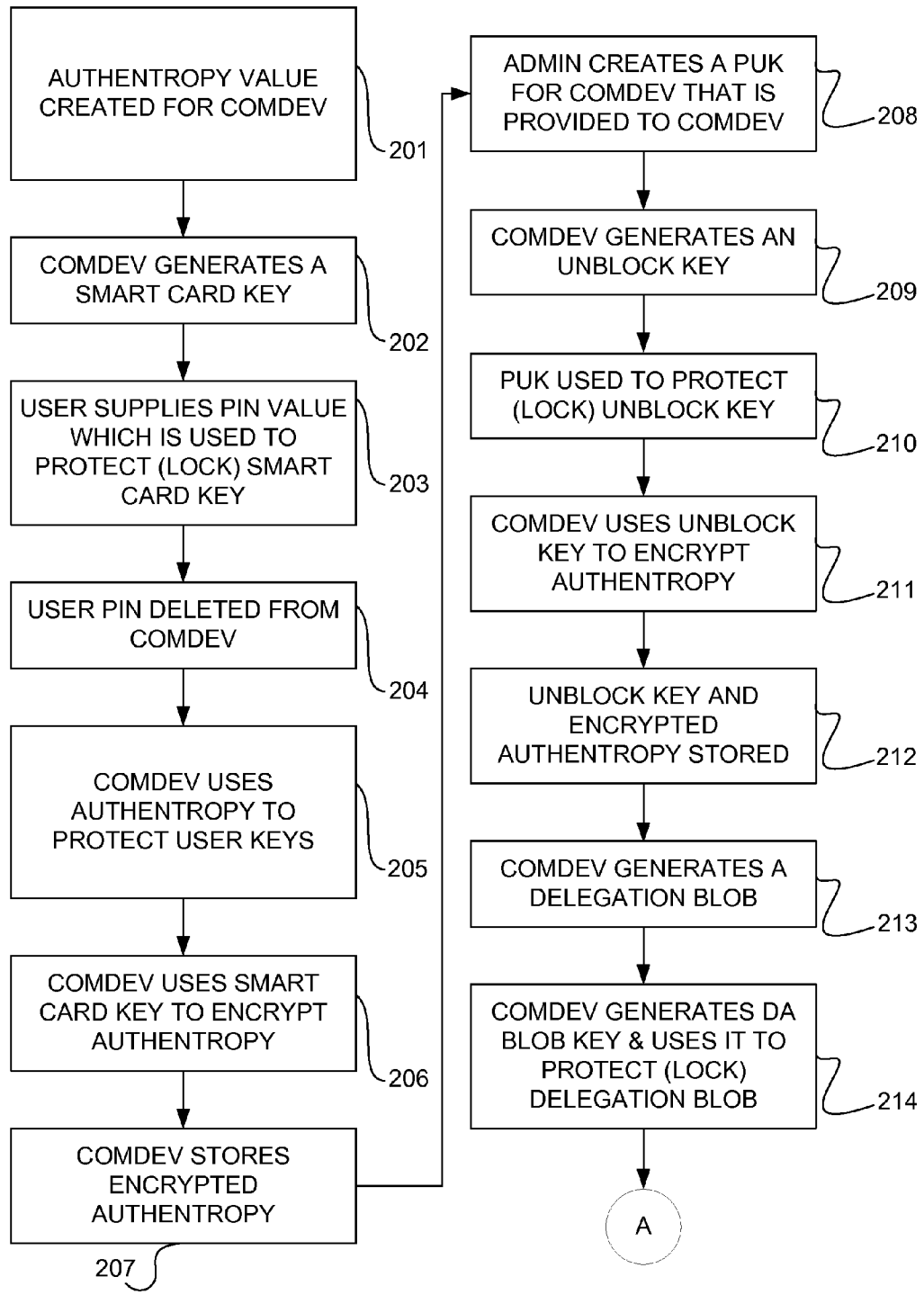

Referring to FIG. 2A, in an embodiment the computing device generates an authentropy 201. In an alternative embodiment a user provides an authentropy to the computing device 201.

In an embodiment the computing device generates a virtual smart card key 202. In an aspect of this embodiment the TrEE of the computing device generates the virtual smart card key 202.

In an embodiment a user creates and supplies a user PIN to the computing device which is used by the computing device to lock the virtual smart card key 203. In an aspect of this embodiment the computing device's TrEE utilizes the user PIN to lock the virtual smart card key 203. In an embodiment the user PIN is subsequently deleted, or otherwise removed, from the computing device 204.

In an embodiment the computing device uses the authentropy to protect, e.g., lock, encrypt, or generate, various user keys 205.

In an embodiment the computing device utilizes the virtual smart card key to encrypt the authentropy 206. In an embodiment the computing device stores the virtual smart card key and the authentropy encrypted with the virtual smart card key 207. In aspects of these embodiments the computing device's TrEE encrypts the authentropy with the virtual smart card key 206 and stores the virtual smart card key and the resultant encrypted authentropy 207. In an aspect of these embodiments the virtual smart card key is stored in meta data for the TrEE 207. In an aspect of these embodiments the authentropy encrypted with the virtual smart card key is stored in meta data for the TrEE 207.

In an embodiment an administrative entity creates a PUK for the computing device that is provided to the computing device 208. In an embodiment the computing device generates an unblock key 209. In an aspect of this embodiment the TrEE of the computing device generates the unblock key for the computing device 209. In an embodiment the computing device uses the PUK to lock the unblock key 210. In an aspect of this embodiment the TrEE of the computing device utilizes the PUK to lock the unblock key 210.

In an embodiment the authentropy is encrypted with the unblock key 211. In an aspect of this embodiment the TrEE of the computing device encrypts the authentropy with the unblock key 211.

In an embodiment the protected unblock key and the authentropy encrypted with the unblock key are stored 212. In an aspect of this embodiment the locked unblock key and the encrypted authentropy are stored in meta data for the TrEE 212.

In an embodiment the computing device generates a delegation authorization, also referred to herein as DA, blob 213. In an aspect of this embodiment the TrEE of the computing device generates the DA blob 213.

Figure 2B:
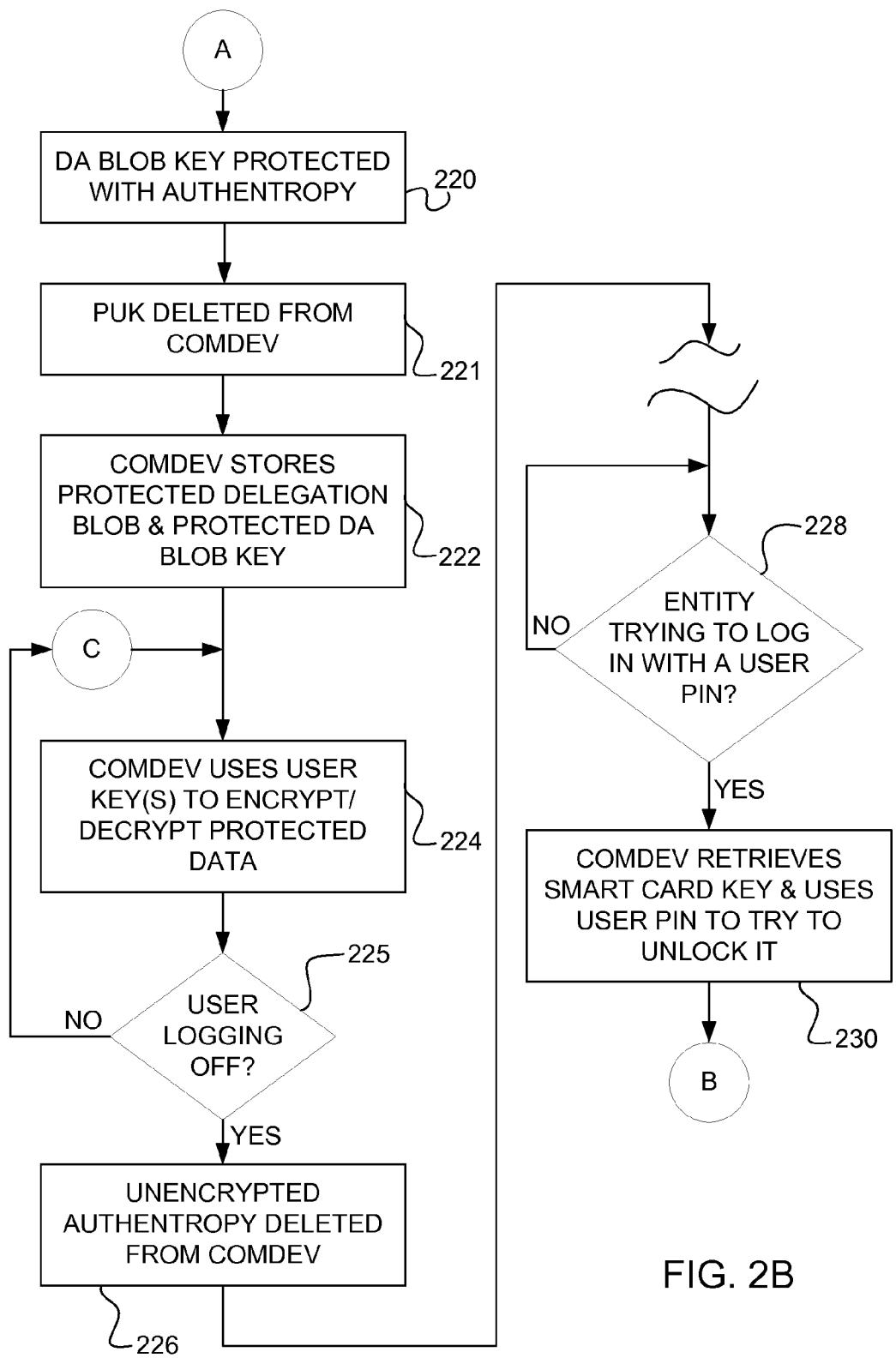

In an embodiment the computing device generates a DA blob key and uses the DA blob key to protect, e.g., lock or encrypt, the DA blob 214. In an aspect of this embodiment the TrEE of the computing device generates the DA blob key and uses it to protect the DA blob 214. Referring to FIG. 2B, the DA blob key is protected, e.g., locked, encrypted and/or generated, with the authentropy 220.

In an embodiment the PUK is subsequently deleted, or otherwise removed, from the computing device 221.

In an embodiment the protected DA blob and the protected DA blob key are stored 222. In an aspect of this embodiment the protected DA blob and protected DA blob key are stored in the TrEE's meta data 222.

In an embodiment the computing device utilizes user keys to encrypt and decrypt protected data as needed, stored on, or otherwise accessible to, the computing device 224. In an aspect of this embodiment the TrEE utilizes user keys to encrypt and decrypt, as needed, protected data stored on, or otherwise accessible to, the computing device 224. In an aspect of this embodiment respective user keys are provided to a filter driver that decrypts/encrypts protected data to data storage pursuant to respective read/write operations 224.

At decision block 225 a determination is made as to whether the user is logging off. If no, computing device processing continues, with, e.g., the computing device utilizing user keys to encrypt and decrypt protected data as needed 224. If at decision block 225 the user is logging off then in an embodiment any existing unencrypted authentropy version is deleted, or otherwise removed, from the computing device 228. In an embodiment the computing device can be logged off.

In an embodiment, at some subsequent time an entity, e.g., valid user, would-be attacker, etc., may attempt to log onto the computing device. In an embodiment at decision block 228 a determination is made as to whether an entity is trying to log into the computing device by inputting a user PIN. If no, in an embodiment the computing device remains logged off until such time as an entity attempts to log in.

If at decision block 228 an entity is attempting to log into the computing device with a user PIN and gain access to the computing device's credentials and protected data, then in an embodiment the computing device retrieves the locked virtual smart card key from its storage and attempts to use the inputted user PIN to unlock the virtual smart card key 230. In an aspect of this embodiment the TrEE of the computing device retrieves the locked virtual smart card key from its meta data and attempts to unlock the virtual smart card key with the inputted user PIN 230.

Figure 2C:
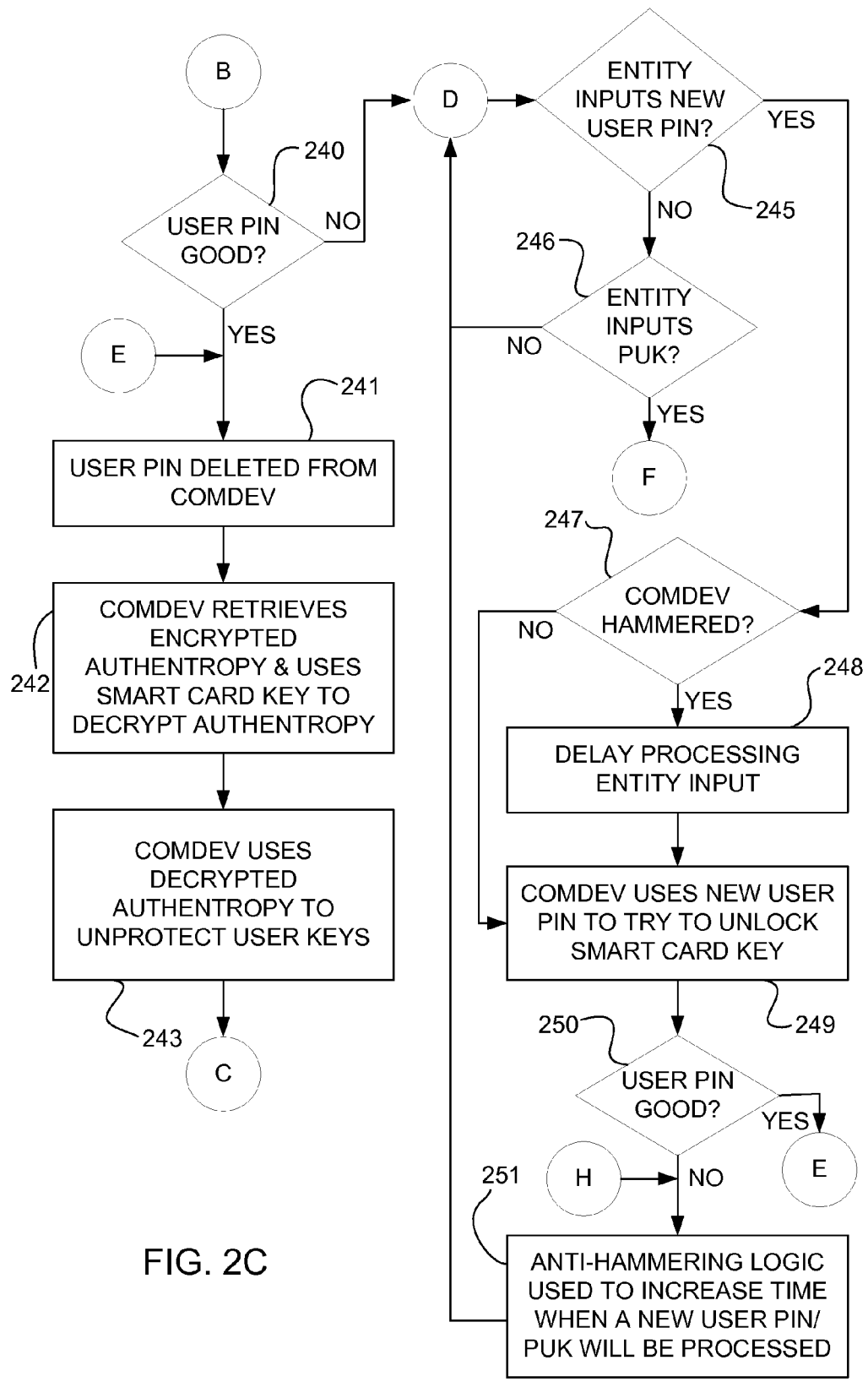

Referring to FIG. 2C, at decision block 240 a determination is made as to whether the inputted user PIN is valid; i.e., whether it could be successfully used to unlock the virtual smart card key. If yes, in an embodiment the user PIN is subsequently deleted from the computing device 241. In an embodiment the computing device retrieves the authentropy encrypted with the virtual smart card key from storage and uses the virtual smart card key to decrypt the authentropy 242. In an aspect of this embodiment the TrEE of the computing device retrieves the encrypted authentropy from TrEE meta data and utilizes the virtual smart card key to decrypt it 242.

In an embodiment the computing device utilizes the decrypted authentropy to unprotect, e.g., unlock, decrypt, or regenerate, user keys 243.

Referring again to FIG. 2B, the computing device uses unprotected user keys to encrypt and decrypt, as needed, computing device protected data 224. In an aspect of this embodiment the TrEE utilizes user keys to encrypt and decrypt protected data 224.

Referring back to decision block 240 of FIG. 2C, if the entity has not input the valid user PIN then in an embodiment at decision block 245 a determination is made as to whether the entity has input a new user PIN value. If yes, in an embodiment at decision block 247 a determination is made as to whether the computing device is being hammered, i.e., whether anti-hammering logic is in effect. If no, then in an embodiment the computing device uses the newly inputted user PIN to try to unlock the virtual smart card key 249. In an aspect of this embodiment the TrEE of the computing device utilizes the newly inputted user PIN to try to unlock the virtual smart card key 249.

At decision block 250 a determination is made as to whether the new inputted user PIN is valid; i.e., whether it was successfully utilized to unlock the virtual smart card key. If yes, in an embodiment the user PIN is subsequently deleted from the computing device 241 and the computing device retrieves the authentropy encrypted with the virtual smart card key from storage and uses the virtual smart card key to decrypt the authentropy 242. In an aspect of this embodiment the TrEE of the computing device retrieves the encrypted authentropy from TrEE meta data and utilizes the virtual smart card key to decrypt it 242.

If at decision block 250 the newly inputted user PIN is invalid then in an embodiment anti-hammering logic may be utilized to increase the time when a new entity input, user PIN or PUK, will be processed for computing device credential access 251. In an aspect of this embodiment the TrEE of the computing device executes the anti-hammering logic to instigate a new, longer wait time, also referred to herein as delay time, or hammer delay time, before any further entity input will be processed for attempted access to the computing device 251.

In an embodiment logic then returns to decision block 245 where a determination is again made as to whether an entity has input a new user PIN to the computing device.

If at decision block 247 the computing device is currently being hammered then in an embodiment the computing device delays the current set hammering time 248. Thereafter, in an embodiment the computing device uses the newly inputted user PIN to try to unlock the virtual smart card key 249. In an aspect of this embodiment the TrEE of the computing device utilizes the newly inputted user PIN to try to unlock the virtual smart card key 249.

If at decision block 245 the entity has not input a new user PIN, in an embodiment at decision block 246 a determination is made as to whether the entity has input a PUK. If no, in an embodiment the logic returns to decision block 245 where again a determination is made as to whether the entity has input a new user PIN.

Figure 2D:
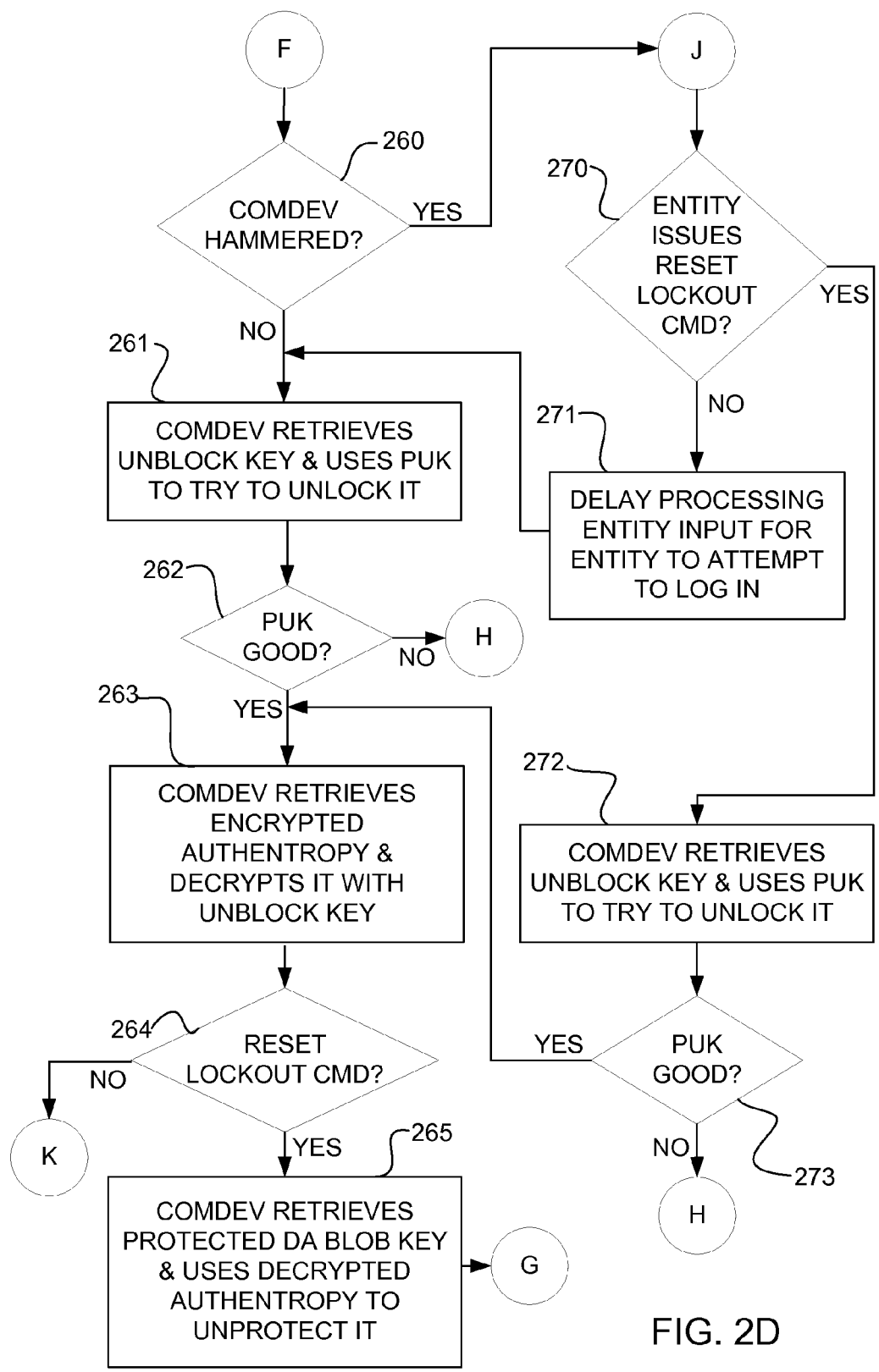

If at decision block 246 the entity has input a PUK then in an embodiment, and referring to FIG. 2D, at decision block 260 a determination is made as to whether the computing device is being hammered. If no, in an embodiment the computing device retrieves the unblock key from storage and attempts to use the inputted PUK to unlock the unblock key 261. In an aspect of this embodiment the TrEE of the computing device retrieves the locked unblock key from its meta data and attempts to unlock the unblock key with the inputted PUK 261.

At decision block 262 a determination is made as to whether the inputted PUK is valid; i.e., whether it was successfully utilized to unlock the unblock key. If no, then in an embodiment and referring again to FIG. 2C anti-hammering logic may be utilized to increase the time when a new entity input, user PIN or PUK, will be processed for computing device credential access 251. In an aspect of this embodiment the TrEE of the computing device executes the anti-hammering logic to instigate a new, longer wait time before any further entity input will be processed for attempted access to the computing device 251.

In an embodiment the logic then returns to decision block 245 where a determination is made as to whether an entity has input a new user PIN to the computing device.

If at decision block 262 of FIG. 2D the PUK is valid, in an embodiment the computing device retrieves the authentropy encrypted with the unblock key from storage and uses the unblock key to decrypt the authentropy 263. In an aspect of this embodiment the TrEE of the computing device retrieves the encrypted authentropy from TrEE meta data and decrypts it utilizing the unblock key 263.

In an embodiment at decision block 264 a determination is made as to whether an entity has issued a valid reset lockout command. If yes in an embodiment the computing device retrieves the protected DA blob key from storage and utilizes the unencrypted authentropy to unprotect, e.g., unlock, decrypt and/or regenerate, the DA blob key 265. In an aspect of this embodiment the computing device TrEE retrieves the protected DA blob key from its storage in the TrEE meta data and uses the unencrypted authentropy to unprotect it 265.

Referring to FIG. 2E, in an embodiment the computing device retrieves the protected delegation blob and uses the DA blob key to unprotect it, e.g., unlock or decrypt it, 276. In an aspect of this embodiment the TrEE of the computing device retrieves the locked DA blob from its storage in the TrEE meta data and utilizes the DA blob key to unprotect the DA blob 276.

In an embodiment the computing device uses the unprotected delegation blob to reset the anti-hammering logic 278. In an aspect of this embodiment the TrEE of the computing device utilizes the unlocked DA blob to reset the anti-hammering logic 278.

In an embodiment the unprotected DA blob and the unprotected DA blob key are deleted from the computing device subsequent to their usage for resetting the anti-hammering logic 280. In an aspect of this embodiment the computing device TrEE deletes the unprotected DA blob and the unprotected DA blob key from the computing device subsequent to their usage for resetting the anti-hammering logic 280.

Whether or not at decision block 264 of FIG. 2D an entity has issued a reset lockout command, in an embodiment and referring to FIG. 2E a user can provide a new user PIN to the computing device 282. In an embodiment the computing device generates a new virtual smart card key and utilizes the new user PIN to lock it 283. In an aspect of this embodiment the TrEE of the computing device generates a new virtual smart card key and utilizes the new user PIN to lock it 283.

In an alternative embodiment the computing device uses the new user PIN to lock the currently existing virtual smart card key 283. In an aspect of this alternative embodiment the computing device TrEE utilizes the new user PIN to lock the existing virtual smart card key 283.

In an embodiment the new user PIN is subsequently deleted, or otherwise removed, from the computing device 284.

In an embodiment the computing device generates a new unblock key and utilizes the PUK to lock it 285. In an aspect of this embodiment the TrEE of the computing device generates the new unblock key and uses the PUK to lock it 285.

In embodiments the computing device 100 may or may not generate a new authentropy 125. In embodiments a user 130 may or may not supply the computing device 100 a new authentropy 125. In aspects of the embodiments where the computing device 100 gets a new authentropy 125 at this juncture the new authentropy 125 is used to protect, e.g., lock, encrypt or generate, user keys 165.

In an embodiment the computing device uses the virtual smart card key to encrypt the authentropy, new or original, 286. In an aspect of this embodiment the TrEE utilizes the virtual smart card key to encrypt the authentropy 286. In an embodiment the computing device stores the locked virtual smart card key and the authentropy encrypted with the virtual smart card key 290. In an aspect of this embodiment the TrEE of the computing device stores the authentropy encrypted with the virtual smart card key 290. In an aspect of this embodiment the authentropy encrypted with the virtual smart card key is stored in TrEE meta data 290. In an aspect of this embodiment the TrEE of the computing device stores the locked virtual smart card key 290. In an aspect of this embodiment the locked virtual smart card key is stored in TrEE meta data 290.

In an embodiment the computing device utilizes the unblock key to encrypt the authentropy, new or original, 291. In an aspect of this embodiment the TrEE uses the unblock key to encrypt the authentropy 291. In an embodiment the computing device thereafter stores the authentropy encrypted with the unblock key 292. In an aspect of this embodiment the computing device TrEE stores the authentropy encrypted with the unblock key 292. In an aspect of this embodiment the authentropy encrypted with the unblock key is stored in TrEE meta data 292.

In an embodiment the computing device stores the locked unblock key 292. In an aspect of this embodiment the TrEE of the computing device stores the locked unblock key 292. In an aspect of this embodiment the locked unblock key is stored in TrEE meta data 292.

In an embodiment the PUK is deleted, or otherwise removed, from the computing device 293.

In an embodiment and referring back to FIG. 2B, the computing device utilizes user keys to encrypt and decrypt protected data as needed, stored on, or otherwise accessible to, the computing device 224. In an aspect of this embodiment the TrEE utilizes user keys to encrypt and decrypt, as needed, protected data 224. In an aspect of this embodiment respective user keys are provided to a filter driver that decrypts/encrypts protected data to data storage pursuant to respective read/write operations 224.

Referring to FIG. 2D, if at decision block 260 an entity has input a PUK and the computing device is being hammered, then in an embodiment at decision block 270 a determination is made as to whether the entity has issued a reset lockout command. If no, in an embodiment the computing device delays the current set hammering time 271. Thereafter, in an embodiment the computing device retrieves the unblock key from storage and attempts to use the inputted PUK to unlock the unblock key 261. In an aspect of this embodiment the TrEE of the computing device retrieves the locked unblock key from its meta data and attempts to unlock the unblock key with the inputted PUK 261.

If at decision block 270 the entity has issued a reset lockout command then in an embodiment the computing device retrieves the locked unblock key from storage and attempts to use the newly inputted PUK to unlock the unblock key 272. In an aspect of this embodiment the TrEE of the computing device retrieves the locked unblock key from its meta data and attempts to unlock the unblock key with the inputted PUK 272.

At decision block 273 a determination is made as to whether the inputted PUK is valid. If yes, in an embodiment the computing device retrieves the authentropy encrypted with the unblock key from storage and uses the unblock key to decrypt the authentropy 263. In an aspect of this embodiment the TrEE of the computing device retrieves the encrypted authentropy from TrEE meta data and then decrypts it utilizing the unblock key 263.

If at decision block 273 the inputted PUK is invalid then in an embodiment and referring to FIG. 2C, anti-hammering logic may be utilized to increase the time when a new entity input, user PIN or PUK, will be processed for computing device credential access 251. In an aspect of this embodiment the TrEE of the computing device executes the anti-hammering logic to instigate a new, longer wait time before any further entity input will be processed for attempted access to the computing device 251.

In an alternative embodiment where an authentropy 125 is not used, when the virtual smart card key 155 is provisioned and locked with a user PIN 105 it is separately locked with the PUK 115 provided by an administrative entity 140, which effectively creates a second locked version of the virtual smart card key 155. In this alternative embodiment, if the user PIN 105 is unavailable the virtual smart card key 155 can be unlocked with the PUK 115 and a legitimate user 130 can thereby gain access to the computing device's protected data 150. In an aspect of this alternative embodiment user keys 165 are protected, e.g., encrypted, locked or generated, with the virtual smart card key 155.

In a second alternative embodiment where an authentropy 125 is not used, the unblock key 145, which is locked by the PUK 115, is used to separately protect, apart from the virtual smart card key 155 protection, user keys 165. In this second alternative embodiment, if the user PIN 105 is unavailable the unblock key 145 can be unlocked with the PUK 115 and the unlocked unblock key 145 can be used to unprotect, e.g., unlock, decrypt or regenerate, user keys 165 thereby providing a legitimate user 130 access to the computing device's protected data 150. In an aspect of this second alternative embodiment user keys 165 are protected, e.g., encrypted, locked or generated, with the virtual smart card key 155, and separately, with the unblock key 145.

Figure 3:
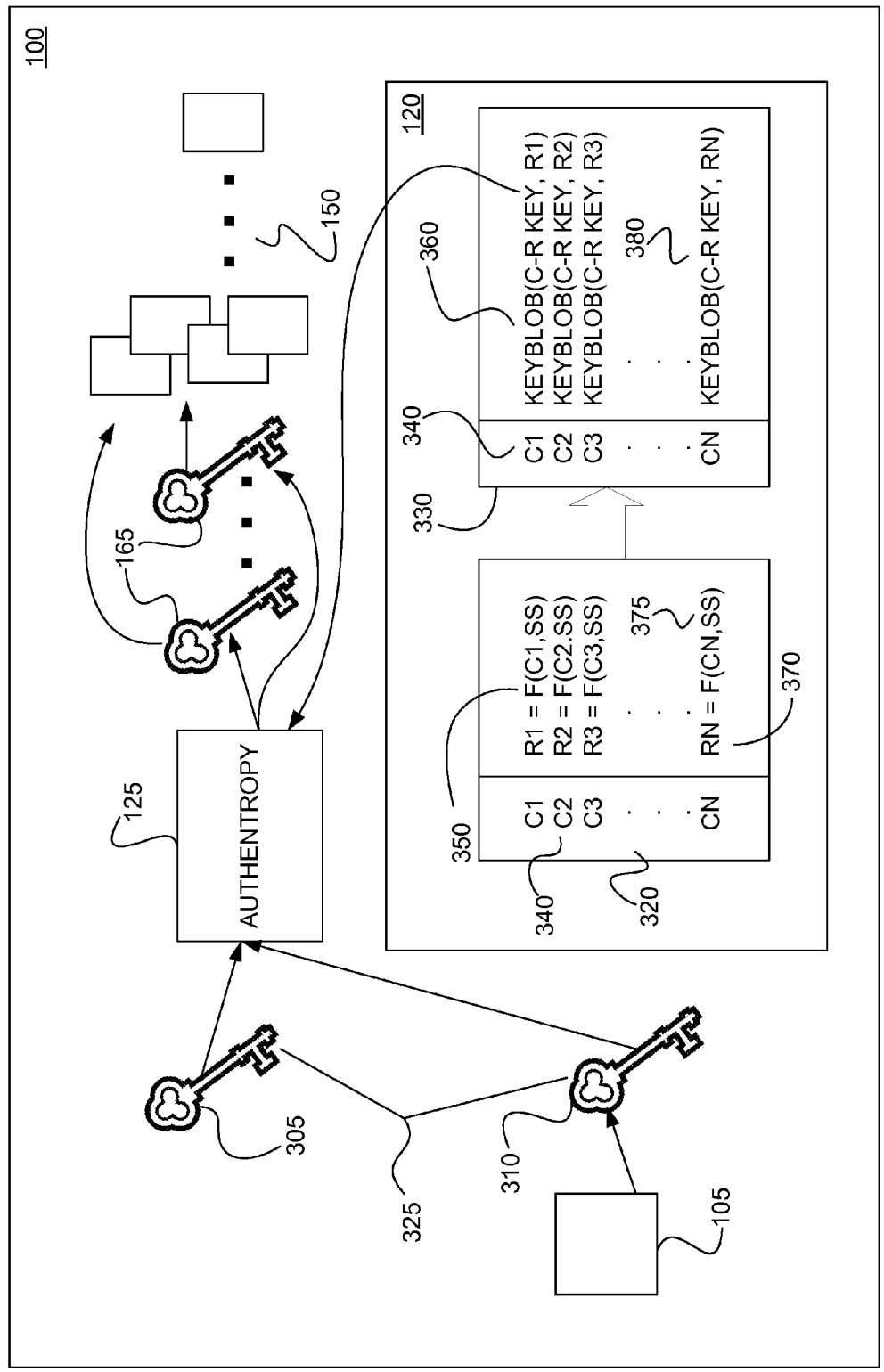
FIG. 3 depicts an embodiment computing device upon which a secure challenge-response based credential unlock system and methodology can be employed.

Referring to FIG. 3, an embodiment computing device 100, also referred to herein as a comdev 100, upon which a secure challenge-response based credential unlock system and methodology can be employed and/or utilized with is depicted. In an embodiment the computing device 100 includes usage of a trusted execution environment 120, i.e., TrEE 120. In an aspect of this embodiment the TrEE 120 is a trusted platform module 120, i.e., TPM 120.

In an embodiment the computing device 100 generates an asymmetric virtual smart card key pair 325 consisting of a virtual smart card public key 305, also referred to herein as pub-key 305, and a virtual smart card private key 310, also referred to herein as priv-key 310. In an aspect of this embodiment the TrEE 120 of the computing device 100 generates the pub-key 305 and priv-key 310 asymmetric key pair 325.

In an embodiment one or more user credentials 105, e.g., a user PIN, a user password, etc., collectively also referred to herein as a user PIN 105, provided to the computing device 100 is used to secure, protect or lock, also collectively referred to herein as lock, the priv-key 310. In embodiments, without inputting the correct user PIN 105 to the computing device 100 a user 130 is locked out of the computing device 100, i.e., the user 130 is prohibited from using the computing device 100 and gaining access to its protected data 150.

In an embodiment the computing device 100 generates an authentropy 125 at some provisioning time, e.g., t(p). In an alternative embodiment a user 130 provides the computing device 100 an authentropy 125 at some provisioning time, e.g., t(p).

In an embodiment the computing device 100 encrypts the authentropy 125 with the pub-key 305 and can subsequently decrypt the authentropy 125, as needed, with the priv-key 310. In an aspect of this embodiment the computing device's TrEE may be used to decrypt the authentropy 125 using the priv-key 310.

In an embodiment the authentropy 125 encrypted with the pub-key 305 is stored. In an aspect of this embodiment the authentropy 125 encrypted with the pub-key 305 is stored in meta data 180 for the TrEE 120.

In an embodiment the computing device 100 generates one or more user keys 165 for use in encrypting and/or decrypting protected data 150. In an aspect of this embodiment the computing device 100 generates one or more user keys 165 and locks and/or encrypts the user keys 165 with the authentropy 125. In this aspect of this embodiment the TrEE 120 may be used to generate user keys 165. In this aspect of this embodiment the TrEE 120 may be used to protect, e.g., lock and/or encrypt, the user keys 165 with the authentropy 125.

In another, or alternative, aspect of this embodiment the computing device 100 generates one or more user keys 165 utilizing a key derivation function and the authentropy 125. In this other aspect of this embodiment the TrEE 120 may be used to generate user keys 165 utilizing a key derivation function and the authentropy 125.

In an embodiment, prior to a user 130 logging off the computing device 100, the unencrypted authentropy 125 is deleted from the computing device 100.

In an embodiment, under normal computing device credential, e.g., cryptographic key, access, a user 130 inputs their user PIN 105 to the computing device 100. In an embodiment the computing device 100 uses the inputted user PIN 105 to unlock the priv-key 310. If the inputted user PIN 105 is valid and the priv-key 310 is thereby successfully unlocked, in an embodiment the computing device 100 utilizes the priv-key 310 to decrypt the authentropy 125 previously encrypted with the pub-key 305. In an embodiment the computing device 100 utilizes the decrypted authentropy 125 to unprotect, e.g., unlock, decrypt or regenerate, user keys 165. In an embodiment the computing device 100 then utilizes the unprotected user keys 165 to encrypt and decrypt protected data 150 as needed.

In an embodiment, if a legitimate user 130 forgets the user PIN 105 or the legitimate user 130 does not know the user PIN 105, a challenge-response protocol may be required for access to the computing device 100 and its credentials, e.g., cryptographic keys, and protected data 150.

In an embodiment the computing device 100 generates a group 320 of one or more challenges, c, 340. In an embodiment, for each challenge 340 of the challenge group 320, the computing device 100 utilizes a function 350 and a shared secret, ss, 375 to generate a corresponding response, r, 370. In an embodiment the shared secret 375 is a symmetric key. In an embodiment the shared secret 375 is a random value of a certain determined size. In an embodiment the shared secret 375 is generated for and provided to the computing device 100 by an administrative entity 140 at some provisioning time, e.g., t(p). In this embodiment the shared secret 375 is shared between the administrative entity 140 and the computing device 100.

As noted, in an embodiment a response 370 is the result of a function 350 that utilizes a challenge 340 and a shared secret 375. In an aspect of this embodiment the TrEE 120 of the computing device 100 generates the group of challenges 320 and derives a response 370 for each challenge 340 utilizing a function 350 with the challenge 340 and the shared secret 375.

In an embodiment for each challenge 340/response 370 pair the computing device 100 generates a unique c-r, challenge-response, key 380. In an embodiment each c-r key 380 is used to protect, e.g., encrypt, the authentropy 125. In an aspect of this embodiment the TrEE 120 of the computing device encrypts the authentropy 125 with the c-r keys 380, generating an encrypted authentropy for each c-r key 380. In an embodiment the various encrypted authentropies, or authentropy versions, are stored on the computing device 100. In an aspect of this embodiment the various encrypted authentropy versions are stored by the TrEE 120 in TrEE meta data 180.

In an embodiment each c-r key 380 is protected, e.g., locked or encrypted, also collectively referred to herein as locked, with the response 370 of the challenge 340/response 370 pair and the resultant c-r key blob 360, along with its respective challenge 340, is stored on the computing device 100. In an aspect of this embodiment each pair of challenge 340/key blob 360 is stored in a challenge table 330 on the computing device 100.

In an aspect of this embodiment the TrEE 120 of the computing device 100 generates the c-r key 380 for each challenge 340/response 370 pair. In an aspect of this embodiment the TrEE 120 locks each c-r key 380 with its related response 370. In an aspect of this embodiment the TrEE 120 stores the challenges 340 and c-r key blobs 360 in TrEE meta data 180.

In an embodiment the computing device 100 also protects, e.g., locks or encrypts, the shared secret 375 with the c-r key 380 for each challenge 340/response 370 pair and stores the resultant protected shared secrets, or shared secret versions. In an embodiment the unprotected shared secret 375 is subsequently deleted from the computing device 100 so that a would-be attacker cannot gain access to it.

In an embodiment the computing device 100 thereafter deletes, or otherwise removes, the responses 370 from the computing device 100. In an aspect of this embodiment the TrEE 120 deletes, or otherwise removes, the responses 370 from the TrEE 120 and the computing device 100.

As previously noted, in an embodiment, if a user 130 has logged off the computing device 100 and a legitimate user 130 subsequently wishes to log back on but has forgotten, or does not know, the user PIN 105, a challenge-response protocol may be required for access to the computing device 100.

In an embodiment where the user PIN 105 is not available to log on with an entity, e.g., a user 130 or an administrative entity 140, collectively referred to herein as a requesting entity 140, may issue a request for a challenge to the computing device 100. In an embodiment the computing device 100 accesses the challenge table 330 and identifies a challenge 340 to send to the requesting entity 140. In an aspect of this embodiment the computing device 100 chooses the next challenge 340 in the challenge table 330 from the challenge 340 that was last sent to a requesting entity 140. In an alternative aspect of this embodiment the computing device 100 randomly chooses a challenge 340 to send to the requesting entity 140. In still other alternative aspects of this embodiment, the computing device 100 uses other schemes to identify a challenge 340 to send to the requesting entity 140, e.g., uses a function to identify the challenge 340 to be sent, etc.

In an aspect of an embodiment the TrEE 120 of the computing device 100 accesses the challenge table 330 and identifies a challenge 340 to send to the requesting entity 140.

In an embodiment, upon receiving a challenge 340, the requesting entity 140 utilizes the same function as the computing device 100 used with the issued challenge 340 and the shared secret 375 to generate a response 370. The requesting entity 140 thereafter sends the generated response 370 to the computing device 100.

Upon receiving a response 370 the computing device 100 utilizes the received response 370 to try to unlock the key blob 360 corresponding to the challenge 340 sent to the requesting entity 140. In an embodiment, if the received response 370 is valid, i.e., correct, and can unlock the requisite key blob 360 then the computing device 100 can gain access to a c-r key 380 which was protected by the issued response 370 and which can be used to decrypt the authentropy 125. In an embodiment the c-r key 380 can also be used to unprotect the shared secret 375 which enables further creation of challenge 340/response 370 pairs.

In an aspect of this embodiment the TrEE 120 of the computing device 100, upon the computing device 100 receiving a response 370, uses the received response 370 to attempt to unlock the key blob 360 corresponding to the issued challenge 340, and if successful, uses the c-r key 380 of the key blob 360 to decrypt the authentropy 125. In an aspect of this embodiment the TrEE 120 also uses the c-r key 380 to unprotect the shared secret 375.

In an embodiment in this situation the computing device 100 generates a new asymmetric virtual smart card key pair 325 consisting of a new pub-key 305 and a new priv-key 310. In an aspect of this embodiment the TrEE 120 of the computing device 100 generates the new pub-key 305 and priv-key 310 asymmetric key pair 325.

In an embodiment a new user PIN 105 is provided to the computing device 100 to lock the new priv-key 310.

In an embodiment the computing device 100 encrypts the authentropy 125 with the new pub-key 305 and can subsequently decrypt the authentropy 125, as needed, with the new priv-key 310. In an aspect of this embodiment the computing device's TrEE 120 may be used to decrypt the authentropy 125 using the new priv-key 310.

In an embodiment in this situation where the computing device 100 has received a correct response 370 to an issued challenge 340, the shared secret 370 is available, i.e., in an unprotected, usable, form, and can now be used to generate more challenge 340/response 370 pairs, each with a respective c-r key 380 and response-locked key blob 360. In an embodiment the unencrypted shared secret 380 is subsequently deleted from the computing device 100 so that a would-be attacker cannot gain access to it.

If a would-be attacker is attempting to gain unwarranted access to the computing device 100 and its protected data 150, the attacker will likely be unable to generate the proper response 370 for the issued challenge 340. In this situation the computing device 100 will not unlock any key blob 360, gain access to a c-r key 380, or, ultimately be able to decrypt the authentropy 125 which is used to protect user keys 165.

In an embodiment, once a computing device 100 issues a challenge 340 for which a valid response 370 is returned, the challenge 340 and its corresponding c-r key 380 are thereafter deleted from the computing device 100, or otherwise not used again.

FIGS. 4A-4D illustrate an embodiment logic flow for a secure challenge-response based credential unlock methodology. While the following discussion is made with respect to systems portrayed herein the operations described may be implemented in other systems. The operations described herein are not limited to the order shown. Additionally, in other alternative embodiments more or fewer operations may be performed.

Figure 4A:
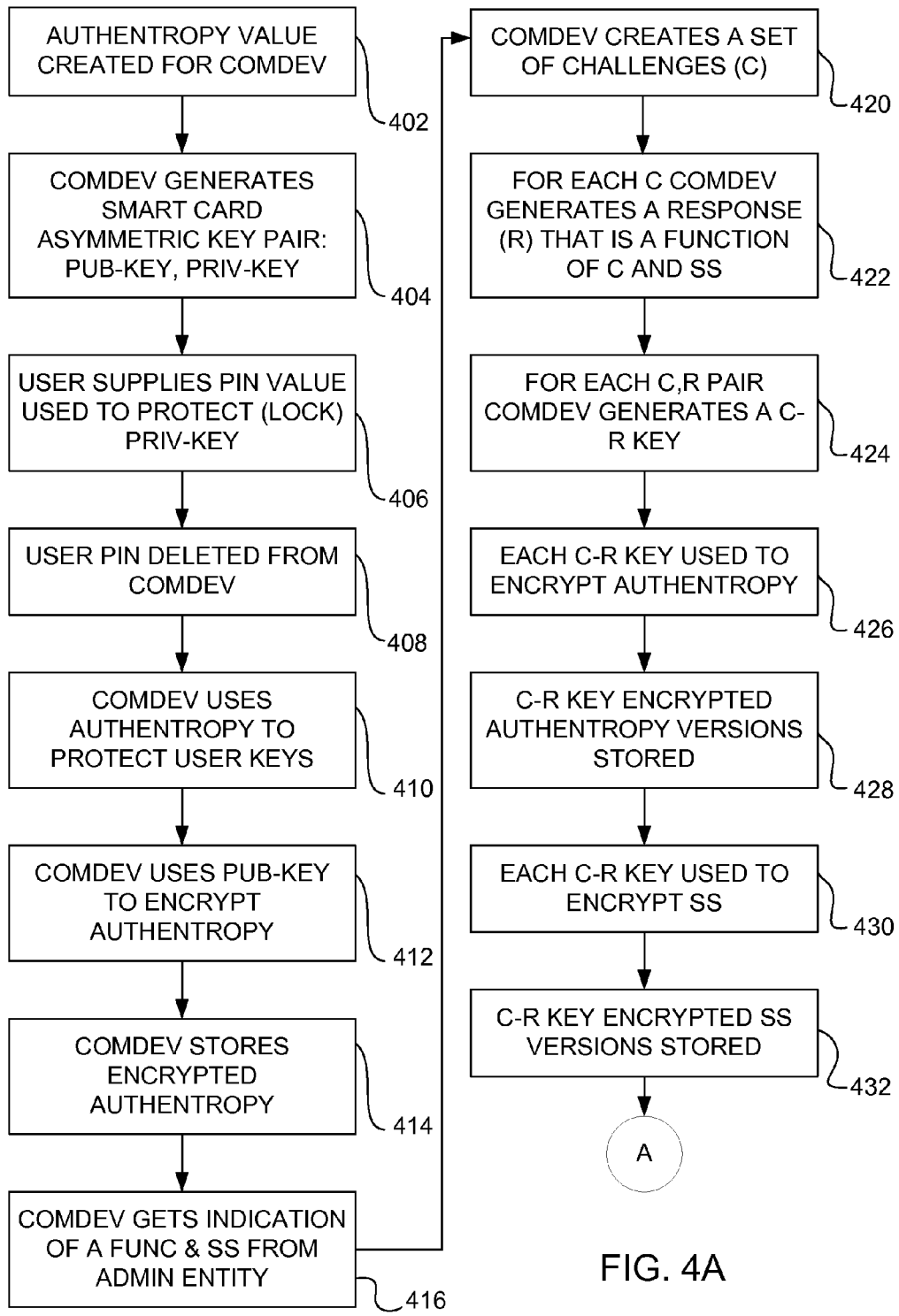

Referring to FIG. 4A, in an embodiment the computing device generates an authentropy 402. In an alternative embodiment a user provides an authentropy to the computing device 402.

In an embodiment the computing device generates a virtual smart card key pair 404. In an aspect of this embodiment the virtual smart card key pair 325 is an asymmetric key pair consisting of a pub-key 305 and a priv-key 310. In an aspect of this embodiment the TrEE of the computing device generates the virtual smart card key pair 404.

In an embodiment a user creates and supplies a user PIN to the computing device which is used by the computing device to lock the priv-key 406. In an aspect of this embodiment the computing device's TrEE utilizes the user PIN to lock the priv-key 406. In an embodiment the computing device stores the priv-key locked with the user PIN 406. In an aspect of this embodiment the priv-key locked with the user PIN is stored in meta data for the TrEE 406.

In an embodiment the user PIN is subsequently deleted, or otherwise removed, from the computing device 408.

In an embodiment the computing device uses the authentropy to protect, e.g., lock, encrypt, or generate, various user keys 410.

In an embodiment the computing device utilizes the pub-key to encrypt the authentropy 412. In an embodiment the computing device stores the authentropy encrypted with the pub-key 414. In an aspect of these embodiments the authentropy encrypted with the pub-key is stored in meta data for the TrEE 414.

In an embodiment the computing device receives an indication of which function to use in a challenge-response scenario and a shared secret, ss, from an entity 416. In an aspect of this embodiment the computing device receives the indication of the function and the ss from an administrative entity 416. In an embodiment the function, f, 350 is a predetermined function 350 set, or, alternatively, created, at some provisioning time, e.g., t(p).

In an embodiment the computing device generates a set of one or more challenges, c, 420. In an aspect of this embodiment the computing device TrEE generates the set of challenges 420. In an aspect of this embodiment each challenge, c, 340 is a random, or pseudo-random, number.

In an embodiment, for each challenge, c, the computing device generates a corresponding response, r, which is a function of the challenge, c, and the shared secret, ss, 422. In an aspect of this embodiment the TrEE generates a response, r, for each challenge, c, 422.

In an embodiment, for each challenge/response pair the computing device generates a challenge-response, c-r, key 424 and each c-r key is used to protect, e.g., encrypt, the authentropy 426. In an aspect of this embodiment the TrEE of the computing device generates a c-r key for each challenge/response pair 424 and uses each c-r key to protect the authentropy 426.

In an embodiment the c-r key protected authentropies, or authentropy versions, are stored on the computing device 428. In an aspect of this embodiment the TrEE of the computing device stores the c-r key protected authentropy versions on the computing device 428. In an aspect of this embodiment the c-r key protected authentropy versions are stored in TrEE meta data 428.

In an embodiment each c-r key is used to protect, e.g., encrypt, the shared secret, ss, 430. In an aspect of this embodiment the TrEE of the computing device uses each c-r key to protect the shared secret 430.

In an embodiment the c-r key protected shared secrets, or shared secret versions, are stored on the computing device 432. In an aspect of this embodiment the TrEE of the computing device stores the c-r key protected shared secret versions on the computing device 432. In an aspect of this embodiment the c-r key protected shared secret versions are stored in TrEE meta data 432.

Referring to FIG. 4B, in an embodiment the unprotected shared secret is deleted from the computing device 434. In an aspect of this embodiment the TrEE of the computing device deletes the shared secret from the computing device 434.

In an embodiment each c-r key is protected, e.g., locked, with the response, r, associated with the c-r key 436. In an aspect of this embodiment the TrEE of the computing device protects each c-r key with its associated response, r, 436.

In an embodiment all the responses, r, are subsequently deleted from the computing device 438. In an aspect of this embodiment the TrEE of the computing device deletes all responses, r, from the computing device 438.

In an embodiment each protected c-r key, also referred to herein as a protected key blob, along with its corresponding challenge, c, is stored 440. In an aspect of this embodiment the TrEE of the computing device stores the protected key blobs and corresponding challenges 440. In an aspect of this embodiment the protected key blobs and corresponding challenges are stored in TrEE meta data 440.

In an embodiment the computing device utilizes user key(s) to encrypt and decrypt, as needed, protected data stored on, or otherwise accessible to, the computing device 442. In this embodiment user keys that are protected with the authentropy are unprotected, e.g., unlocked, decrypted and/or regenerated, as needed for use in encrypting and decrypting protected data 442.

At decision block 444 a determination is made as to whether the user is logging off. If no, computing device processing continues, with, e.g., the computing device utilizing user key(s) to encrypt and decrypt protected data as needed 442.

If at decision block 444 the user is logging off then in an embodiment any existing unencrypted authentropy version is deleted, or otherwise removed, from the computing device 446. In an embodiment the computing device can be logged off.

In an embodiment, at some subsequent time an entity, e.g., valid user, would-be attacker, etc., may attempt to log onto the computing device. In an embodiment at decision block 448 a determination is made as to whether an entity is trying to log onto the computing device by inputting a user PIN. If yes, then in an embodiment the computing device attempts to use the inputted user PIN to unlock the priv-key 450. In an aspect of this embodiment the TrEE of the computing device attempts to unlock the priv-key with the inputted user PIN 450.

At decision block 454 a determination is made as to whether the inputted user PIN is valid; i.e., whether it was successful in unlocking the priv-key. If yes, in an embodiment the user PIN is subsequently deleted from the computing device 456. In an embodiment the computing device retrieves the authentropy previously encrypted with the pub-key from storage and uses the priv-key to decrypt the authentropy 458. In an aspect of this embodiment the TrEE of the computing device retrieves the encrypted authentropy from TrEE meta data and utilizes the priv-key to decrypt it 458.

In an embodiment the computing device utilizes the decrypted authentropy to unprotect, e.g., unlock, decrypt and/or regenerate, as needed one or more user keys 442. In an embodiment the computing device utilizes user key(s) to encrypt and decrypt, as needed, protected data stored on, or otherwise accessible, to the computing device 442.

Figure 4C:
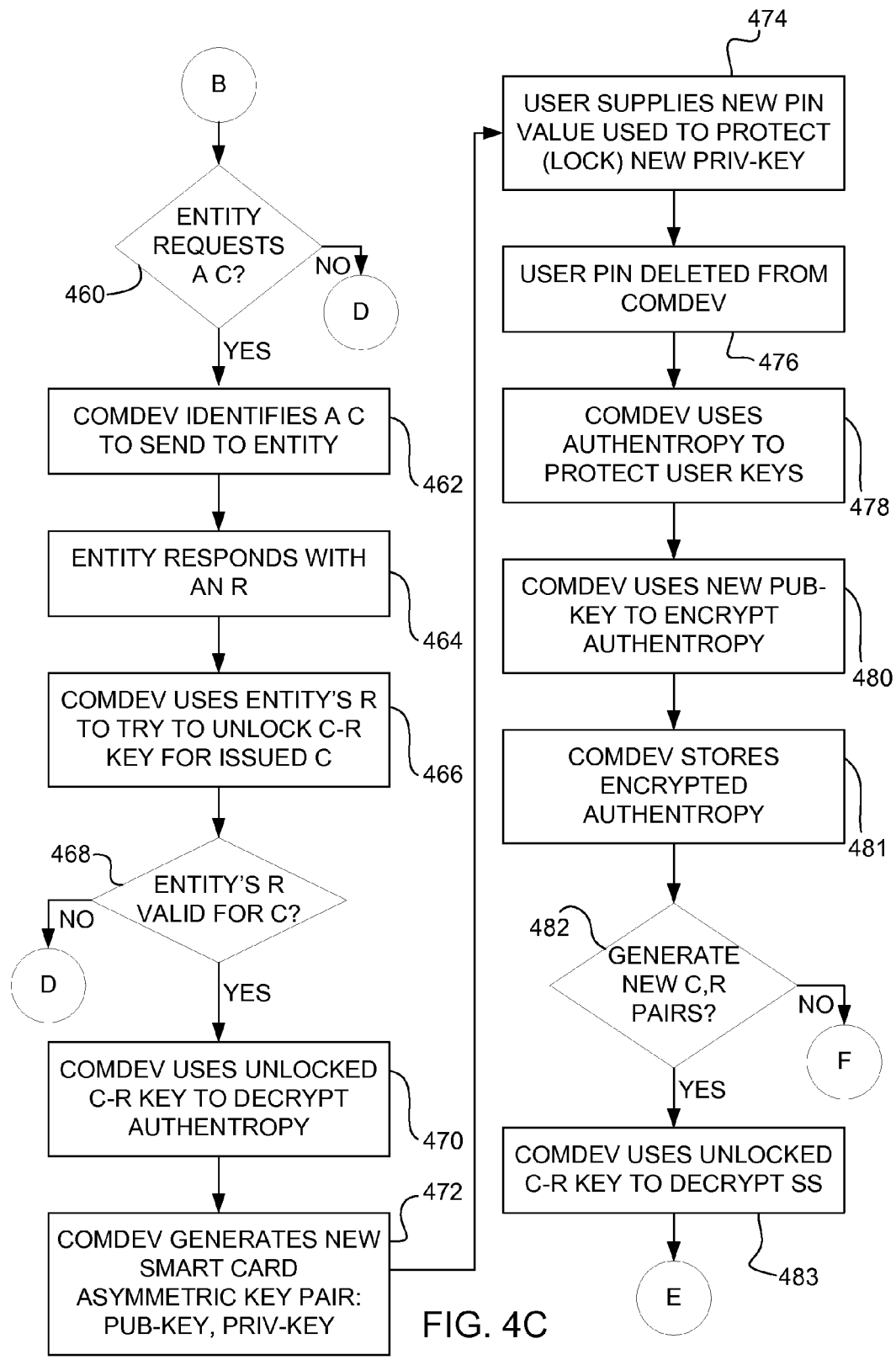

Referring to decision block 448 or decision block 454, if the entity has not input a user PIN or the valid user PIN respectively, then in an embodiment, and referring to FIG. 4C, at decision block 460 a determination is made as to whether the entity has requested a challenge. If no, in an embodiment the logic returns to decision block 448 of FIG. 4B, where a determination is made as to whether an entity is attempting to log in with a user PIN.

If at decision block 460 of FIG. 4C an entity has requested a challenge then in an embodiment the computing device identifies a challenge from its set of pre-established challenges and provides it to the requesting entity 462. In an aspect of this embodiment the TrEE of the computing device identifies the challenge to send to the requesting entity 462. In an aspect of this embodiment the identified challenge is the next challenge 340 in the set of challenges 320 from the challenge 340 that was last output to a requesting entity.

In an embodiment a requesting entity responds with a response, r, to the issued challenge, c, 464. In an embodiment the computing device uses the inputted response to attempt to unlock the protected key blob associated with the currently issued challenge 466. In an aspect of this embodiment the TrEE attempts to unlock the protected c-r key with the inputted response, r, 466.

At decision block 468 a determination is made as to whether the inputted response is valid, i.e., can unlock the protected c-r key corresponding to the issued challenge. If no, in an embodiment the logic returns to decision block 448 of FIG. 4B where a determination is made as to whether an entity is attempting to log into the computing device with a user PIN.

If at decision block 468 the inputted response is valid, i.e., it unlocks the appropriate c-r key for the issued challenge, c, in an embodiment the computing device uses the unlocked c-r key to decrypt the authentropy 470. In an aspect of this embodiment the TrEE of the computing device utilizes the unlocked c-r key to decrypt the prior encrypted authentropy 470. In this embodiment the unencrypted authentropy 125 will provide, indirectly, access to protected data 150, as previously discussed.

In an embodiment the computing device generates a new virtual smart, card key pair 472. In an aspect of this embodiment the new virtual smart card key pair 325 is an asymmetric key pair consisting of a pub-key 305 and a priv-key 310. In an aspect of this embodiment the TrEE of the computing device generates the new virtual smart card key pair 472.

In an embodiment a user creates and supplies a new user PIN to the computing device which is used by the computing device to lock the new priv-key 474. In an aspect of this embodiment the computing device's TrEE utilizes the new user PIN to lock the new priv-key 474. In an embodiment the computing device stores the new priv-key locked with the new user PIN 474. In an aspect of this embodiment the new priv-key locked with the new user PIN is stored in meta data for the TrEE 406.

In an embodiment the user PIN is subsequently deleted, or otherwise removed, from the computing device 476.

In an embodiment the computing device uses the authentropy to protect, e.g., lock, encrypt, or generate, various user keys 478.

In an embodiment the computing device utilizes the new pub-key to encrypt the authentropy 480. In an embodiment the computing device stores the authentropy encrypted with the new pub-key 481. In an aspect of these embodiments the authentropy encrypted with the new pub-key is stored in meta data for the TrEE 481.

In an embodiment at decision block 482 a determination is made as to whether the computing device will generate one or more new challenge/response pairs at this time. In aspects of this embodiment the computing device 100 will generate new challenge 340/response 370 pairs at this time if, e.g., there are no more challenges, c, 340 remaining, there is less than a preset threshold of remaining challenges, c, 340, it is a predetermined time frame for the computing device 100 to generate new challenges, c, 340, etc.

Figure 4D:
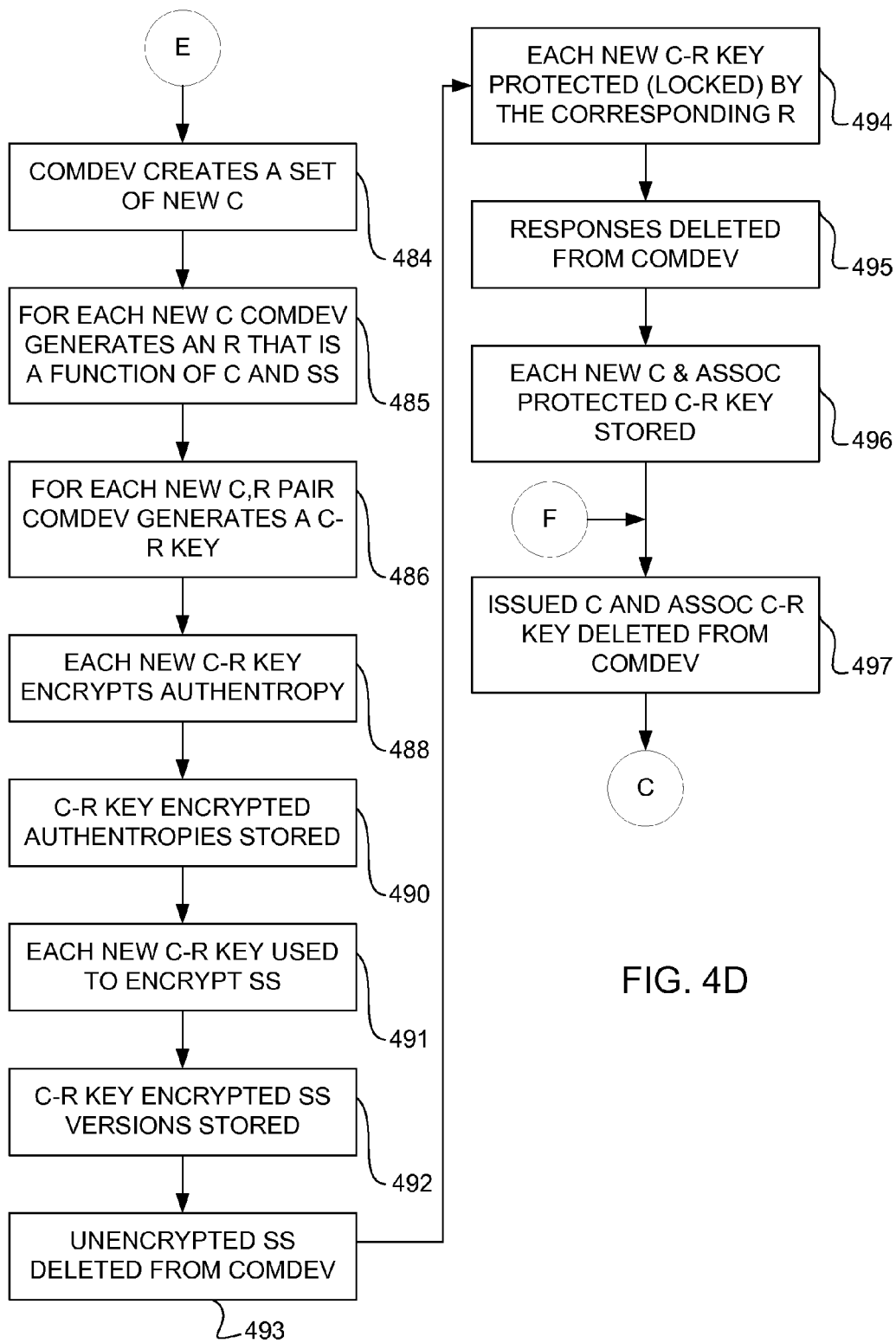

If at decision block 482 it is determined that the computing device will not generate new challenge/response pairs at this time then, referring to FIG. 4D, in an embodiment, as the computing device received a valid response, r, to its issued challenge, c, the issued challenge, c, and its associated c-r key are deleted from the computing device 497. In an aspect of this embodiment the TrEE of the computing device deletes the issued challenge, c, and its associated c-r key from the computing device 497.

In an embodiment, and referring back to FIG. 4B, the computing device can utilize user key(s) to encrypt and decrypt, as needed, protected data stored on, or otherwise accessible to, the computing device 442. In this embodiment user keys that are protected with the authentropy are unprotected, e.g., unlocked, decrypted and/or regenerated, as needed for use in encrypting and decrypting protected data 442.

Referring again to FIG. 4C, if at decision block 482 it is determined that the computing device will generate new challenges/response pairs at this time then in an embodiment the computing device uses the unlocked c-r key to decrypt the shared secret, ss, 483. In an aspect of this embodiment the TrEE of the computing device utilizes the unlocked c-r key to decrypt the corresponding prior encrypted shared secret, ss, 483. In this manner the computing device 100 has the capability to generate new challenge 340/response 370 pairs and their accompany c-r keys 380.

In an embodiment, and referring to FIG. 4D, the computing device generates a set of challenges, c, 484. In an aspect of this embodiment the computing device TrEE generates a new, or additional, set of one or more challenges 484.

In an embodiment, for each new challenge, c, the computing device generates a corresponding response, r, which is a function of the challenge, c, and the shared secret, ss, 485. In an aspect of this embodiment the computing device TrEE generates a response, r, for each new challenge, c, 485.

In an embodiment, for each new challenge/response pair the computing device generates a c-r key 486 and each new c-r key is used to protect, e.g., encrypt, the authentropy 488. In an aspect of this embodiment the TrEE of the computing device generates the c-r key for each new challenge/response pair 486 and uses each new c-r key to protect the authentropy 488.

In an embodiment the new c-r key protected authentropies, or authentropy versions, are stored on the computing device 490. In an aspect of this embodiment the TrEE of the computing device stores the new c-r key protected authentropy versions on the computing device 490. In an aspect of this embodiment the new c-r key protected authentropy versions are stored in TrEE meta data 490.

In an embodiment each new c-r key is used to protect, e.g., encrypt, the shared secret, ss, 491. In an aspect of this embodiment the computing device TrEE uses each new c-r key to protect the shared secret 491.

In an embodiment the new c-r key protected shared secrets, or shared secret versions, are stored on the computing device 492. In an aspect of this embodiment the computing device TrEE stores the new c-r key protected shared secret versions on the computing device 492. In an aspect of this embodiment the new c-r key protected shared secret versions are stored in TrEE meta data 492.

In an embodiment the unprotected shared secret, ss, is deleted from the computing device 493. In an aspect of this embodiment the computing device TrEE deletes the shared secret, ss, from the computing device 493.

In an embodiment each new c-r key is protected, e.g., locked, with the response, r, associated with the new c-r key 494. In an aspect of this embodiment the computing device TrEE protects each new c-r key with its associated response, r, 494.

In an embodiment all responses, r, are subsequently deleted from the computing device 495. In an aspect of this embodiment the computing device TrEE deletes all responses from the computing device subsequent to responses being used to lock the newly generated c-r keys 495.

In an embodiment each newly protected c-r key, along with its associated challenge, c, is stored 496. In an aspect of this embodiment the computing device TrEE stores the newly protected c-r keys and their corresponding challenges 496. In an aspect of this embodiment the protected c-r keys and corresponding challenges are stored in TrEE meta data 496.

In an embodiment, as the computing device received a valid response, r, to its issued challenge, c, the issued challenge, c, and its associated c-r key are deleted from the computing device 497. In an aspect of this embodiment the computing device TrEE deletes the issued challenge, c, and its associated c-r key from the computing device 497.

In an embodiment, and referring back to FIG. 4B, the computing device can utilize user key(s) to encrypt and decrypt, as needed, protected data stored on, or otherwise accessible to, the computing device 442. In this embodiment user keys that are protected with the authentropy are unprotected, e.g., unlocked, decrypted and/or regenerated, as needed for use in encrypting and decrypting protected data 442.

Figure 5:
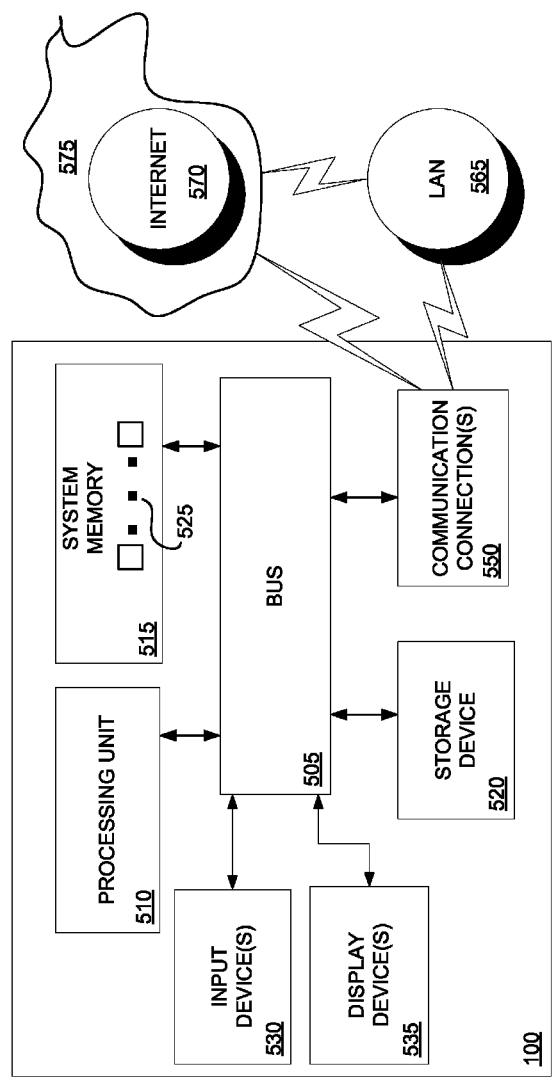
FIG. 5 is a block diagram of an exemplary basic computing device with the capability to process software, i.e., program code, or instructions.

In embodiments functionality for supporting secure credential unlock in the PIN based credential unlock systems and methodologies and the challenge-response based credential unlock systems and methodologies, e.g., generating an unblock key 145, locking the unblock key 145 with a PUK 115, generating a group of challenges 320, formulating a response 370 for each challenge 340 of the group of challenges 320, etc., is performed during the execution of one or more procedures 525 shown in FIG. 5. In embodiments a procedure 525, also referred to herein as an application, program, or software code, is a set of instructions that upon execution performs a specific task, or function, for a computing device 100. In embodiments a procedure 525, when executed, tells a computing device 100 what to do and how to accomplish it. In embodiments a procedure 525 can include data used by the set of instructions to accomplish the designed functionality.

Computing Device Configuration

FIG. 5 is a block diagram that illustrates an exemplary computing device 100 upon which embodiments described herein can be implemented.

The embodiment computing device 100 includes a bus 505 or other mechanism for communicating information, and a processing unit 510, also referred to herein as a processor 510, coupled with the bus 505 for processing information. The computing device 100 also includes system memory 515, which may be volatile or dynamic, such as random access memory (RAM), non-volatile or static, such as read-only memory (ROM) or flash memory, or some combination of the two. The system memory 515 is coupled to the bus 505 for storing information and instructions to be executed by the processor 510, and may also be used for storing temporary variables or other intermediate information during the execution of instructions by the processor 510. The system memory 515 often contains an operating system and one or more programs 525, or applications or procedures, and/or software code, and may also include program data.

In an embodiment a storage device 520, such as a magnetic or optical disk, is also coupled to the bus 505 for storing information, including program code of instructions and/or data. In an embodiment computing device 100 the storage device 520 is computer readable storage, or machine readable storage, 520.

Embodiment computing devices 100 generally include one or more display devices 535, such as, but not limited to, a display screen, e.g., a cathode ray tube (CRT) or liquid crystal display (LCD), a printer, and one or more speakers, for providing information to a computing device user 130. Embodiment computing devices 100 also generally include one or more input devices 530, such as, but not limited to, a keyboard, mouse, trackball, pen, voice input device(s), and touch input devices, which a user 130 can utilize to communicate information and command selections to the processor 510. All of these devices are known in the art and need not be discussed at length here.

The processor 510 executes one or more sequences of one or more programs 525, or applications or procedures, and/or software code instructions contained in the system memory 515. These instructions may be read into the system memory 515 from another computing device-readable medium, including, but not limited to, the storage device 520. In alternative embodiments, hard-wired circuitry may be used in place of or in combination with software instructions. Embodiment computing device 100 environments are not limited to any specific combination of hardware circuitry and/or software.

The term "computing device-readable medium" as used herein refers to any medium that can participate in providing program, or application, and/or software instructions to the processor 510 for execution. Such a medium may take many forms, including but not limited to, storage media and transmission media. Examples of storage media include, but are not limited to, RAM, ROM, EEPROM, flash memory, CD-ROM, digital versatile disks (DVD), magnetic cassettes, magnetic tape, magnetic disk storage, or any other magnetic medium, floppy disks, flexible disks, punch cards, paper tape, or any other physical medium with patterns of holes, memory chip, or cartridge. The system memory 515 and storage device 520 of embodiment computing devices 100 are further examples of storage media. Examples of transmission media include, but are not limited to, wired media such as coaxial cable(s), copper wire and optical fiber, and wireless media such as optic signals, acoustic signals, RF signals and infrared signals.

An embodiment computing device 100 also includes one or more communication connections 550 coupled to the bus 505. Embodiment communication connection(s) 550 provide a two-way data communication coupling from the computing device 100 to other computing devices on a local area network (LAN) 565 and/or wide area network (WAN), including the world wide web, or internet, 570 and various other communication networks 575, e.g., SMS-based networks, telephone system networks, etc. Examples of the communication connections(s) 550 include, but are not limited to, an integrated services digital network (ISDN) card, modem, LAN card, and any device capable of sending and receiving electrical, electromagnetic, optical, acoustic, RF or infrared signals.

Communications received by an embodiment computing device 100 can include program, or application, and/or software instructions and data. Instructions received by the embodiment computing device 100 may be executed by the processor 510 as they are received, and/or stored in the storage device 520 or other non-volatile storage for later execution.

CONCLUSION

While various embodiments are described herein, these embodiments have been presented by way of example only and are not intended to limit the scope of the claimed subject matter. Many variations are possible which remain within the scope of the following claims. Such variations are clear after inspection of the specification, drawings and claims herein. Accordingly, the breadth and scope of the claimed subject matter is not to be restricted except as defined with the following claims and their equivalents.

What is claimed is:

1. A method performed on a computing device that includes memory and a trusted platform module ("TPM"), the method comprising:
   receiving, by the computing device, a personal identification number ("PIN") unlock key ("PUK");
   determining, by the computing device in response to the receiving, that the received PUK is valid;
   receiving, by the computing device, a new user PIN;
   locking, by the TPM based on the new user PIN and based on the PUK being valid, a virtual smart card key;
   locking, by the TPM, an authentropy; and
   storing, by the TPM, the locked authentropy and the virtual smart card key, where the authentropy is configured for protecting a user key.

2. The method of claim 1 further comprising removing the received new user PIN from the computing device after the virtual smart car key is locked.

3. The method of claim 1 further comprising generating, by the TPM, the virtual smart card key.

4. The method of claim 3 where the authentropy is locked using the generated virtual smart card key.

5. The method of claim 1 further comprising:
   generating a new unblock key; and
   locking the new unblock key using the PUK.

6. The method of claim 5 further comprising locking, by the TPM, the authentropy using the new unblock key.

7. The method of claim 6 further comprising:
   removing the PUK from the computing device after the authentropy is locked using the new unblock key; and
   storing, by the TPM, the authentropy locked using the new unblock key.

8. A computing device comprising: that includes
   a processor;
   memory coupled to the processor;
   an input device via which the computing device receives a personal identification number ("PIN") unlock key ("PUK");
   the computing device configured to determine that the received PUK is valid;
   an input device via which the computing device further receives a new user PIN;
   a trusted platform module ("TPM") configured to lock, based on the new user PIN and based on the received PUK being valid, a virtual smart card key;
   the trusted platform module ("TPM") further configured to lock an authentropy; and
   the trusted platform module ("TPM") further configured to store the locked authentropy and the locked virtual smart card key.

9. The computing device of claim 8 further configured to remove the received new user PIN from the computing device after the virtual smart card key is locked.

10. The computing device of claim 8, the TPM further configured to generate the virtual smart card key.

11. The computing device of claim 10 where the authentropy is locked using the generated virtual smart card key.

12. The computing device of claim 8 further configured to:
   generate a new unblock key; and
   lock the new unblock key using the PUK.

13. The computing device of claim 12, the TPM further configured to lock the authentropy using the new unblock key.

14. The computing device of claim 13 further configured to remove the PUK from the computing device after the authentropy is locked using the new unblock key, and TPM configured to store the authentropy locked using the new unblock key.

15. At least one computer-readable medium that is not a signal per se and that stores computer-executable instructions that, when executed by a computing device that includes memory and a trusted platform module ("TPM"), causes the computing device to perform actions comprising:

receiving a personal identification number ("PIN") unlock key ("PUK");
determining, in response to the receiving, that the received PUK is valid;
receiving a new user PIN;
locking, by the TPM based on the new user PIN and based on the PUK being valid, a virtual smart card key;
locking, by the TPM, an authentropy; and
storing, by the TPM, the locked authentropy and the at least one virtual smart card key, where the authentropy is configured for protecting various user keys.

16. The at least one computer-readable medium of claim 15, the actions further comprising removing the received new user PIN from the computing device after the virtual smart car key is locked.

17. The at least one computer-readable medium of claim 15, the actions further comprising generating, by the TPM, the virtual smart card key.

18. The at least one computer-readable medium of claim 17 where the authentropy is locked using the generated virtual smart card key.

19. The at least one computer-readable medium of claim 15, the actions further comprising:
generating a new unblock key; and
locking the new unblock key using the PUK.

20. The at least one computer-readable medium of claim 19, the actions further comprising:
locking, by the TPM, the authentropy using the new unblock key;
removing the PUK from the computing device after the authentropy is locked using the new unblock key; and
storing, by the TPM, the authentropy locked using the new unblock key.

\* \* \* \* \*